United States Patent
Park

(10) Patent No.: US 9,749,724 B2
(45) Date of Patent: Aug. 29, 2017

(54) SPEAKER MODULE, ELECTRONIC DEVICE INCLUDING THE SPEAKER MODULE, AND DISPLAY DEVICE INCLUDING THE ELECTRONIC DEVICE

(71) Applicant: LG ELECTRONICS INC., Seoul (KR)

(72) Inventor: Jongha Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/200,699

(22) Filed: Jul. 1, 2016

(65) Prior Publication Data

US 2017/0150244 A1    May 25, 2017

(30) Foreign Application Priority Data

Nov. 24, 2015  (KR) .................. 10-2015-0164502

(51) Int. Cl.
*H04R 1/02* (2006.01)

(52) U.S. Cl.
CPC ....... *H04R 1/026* (2013.01); *H04R 2201/405* (2013.01); *H04R 2499/15* (2013.01)

(58) Field of Classification Search
CPC ........ H04R 1/403; H04R 1/02; H04R 1/2834; H04R 1/26; H04R 5/02; H04R 1/227; H04R 1/2819
USPC ......... 381/333, 334, 160, 388, 304; 181/199
See application file for complete search history.

(56) References Cited

U.S. PATENT DOCUMENTS

| | | | | |
|---|---|---|---|---|
| 5,067,159 A | * | 11/1991 | Kasai | H04R 1/02 181/144 |
| 5,109,416 A | * | 4/1992 | Croft | H04R 5/02 381/1 |
| 5,233,664 A | * | 8/1993 | Yanagawa | H04R 1/403 381/182 |
| 8,837,763 B1 | * | 9/2014 | Millen | H04R 1/2834 181/145 |
| 2007/0030993 A1 | * | 2/2007 | Yun | H04R 5/02 381/388 |
| 2007/0087784 A1 | * | 4/2007 | Yamamoto | H04R 5/02 455/557 |
| 2008/0165991 A1 | | 7/2008 | Shyu | |
| 2009/0099492 A1 | * | 4/2009 | Farrell | A61F 5/05866 602/21 |

(Continued)

FOREIGN PATENT DOCUMENTS

| | | |
|---|---|---|
| EP | 3133827 A | 2/2017 |
| JP | H11205884 A | 7/1999 |

(Continued)

*Primary Examiner* — Md S Elahee
*Assistant Examiner* — Julie X Dang
(74) *Attorney, Agent, or Firm* — Dentons US LLP

(57) ABSTRACT

A speaker module, An electronic device, and a display device include a housing, a main board, and at least one speaker module placed in the housing. The at least one speaker module includes at least one first speaker unit disposed in a first direction and at least one second speaker unit disposed in a second direction different from the first direction and having at least one side of the at least one second speaker unit contacting with at least one side of the at least one first speaker unit. Driving vibrations may be offsetted because the speaker units are disposed in different directions.

11 Claims, 26 Drawing Sheets

(56) References Cited

U.S. PATENT DOCUMENTS

| | | | |
|---|---|---|---|
| 2011/0084838 A1* | 4/2011 | Fawcett | A47F 7/024 340/568.8 |
| 2011/0188678 A1* | 8/2011 | Lee | H04R 1/26 381/152 |
| 2011/0188679 A1* | 8/2011 | Lee | H04R 1/00 381/152 |
| 2012/0039492 A1* | 2/2012 | Fincham | H04S 1/002 381/152 |
| 2012/0163645 A1* | 6/2012 | Hwang | H05K 5/02 381/333 |
| 2014/0064522 A1 | 3/2014 | Litovsky | |
| 2014/0098979 A1* | 4/2014 | Osborn | H04R 5/02 381/300 |
| 2014/0314249 A1 | 10/2014 | Fincham | |
| 2014/0321689 A1 | 10/2014 | Chen | |
| 2015/0086056 A1* | 3/2015 | Ikuma | H04R 1/02 381/335 |

FOREIGN PATENT DOCUMENTS

| | | |
|---|---|---|
| JP | 2004-015565 A | 1/2004 |
| JP | 2004015565 A | 1/2004 |
| JP | 2008-109382 A | 5/2008 |
| JP | 2008109382 A | 5/2008 |
| JP | 2008-154084 A | 7/2008 |
| JP | 2008154084 A | 7/2008 |

* cited by examiner

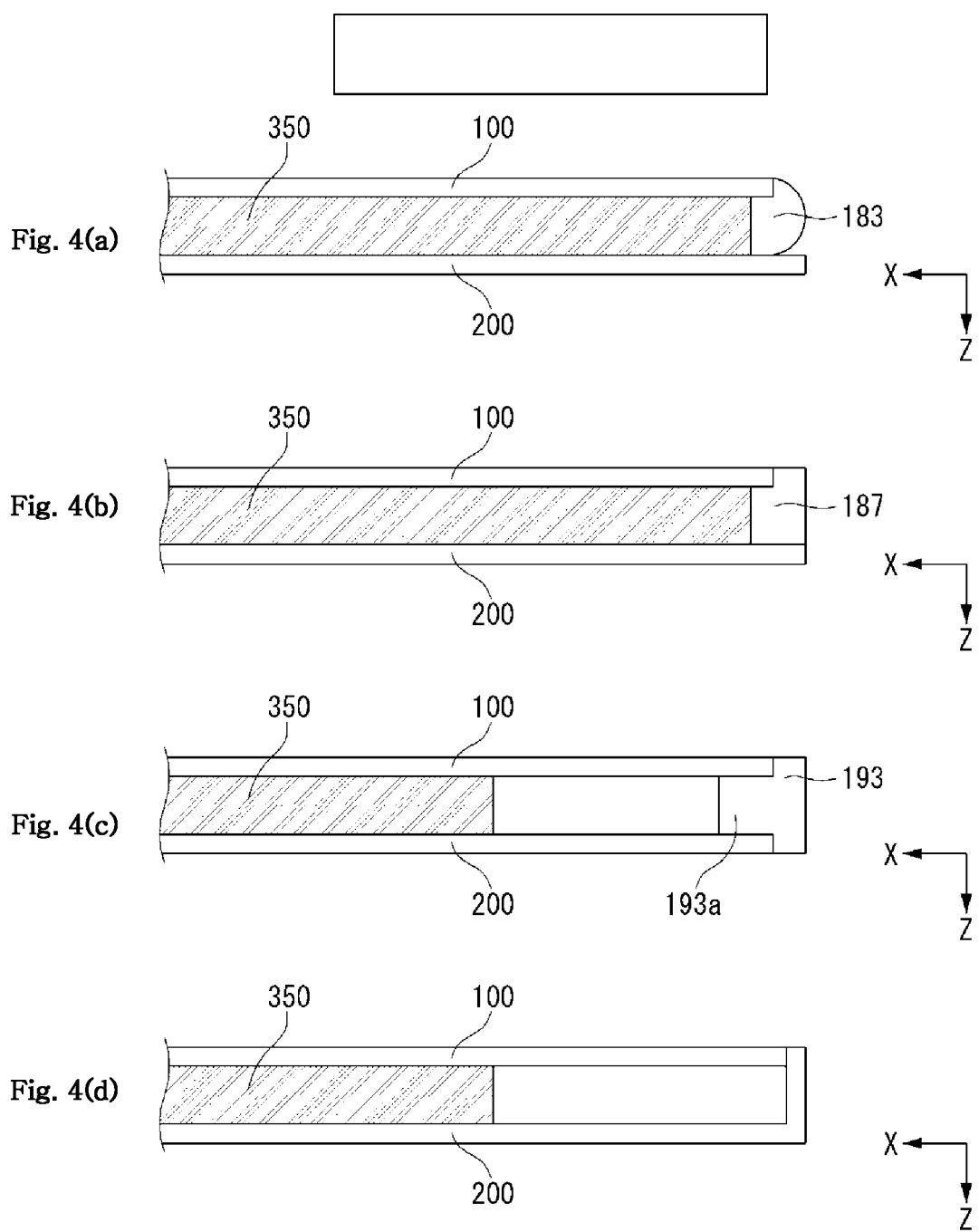

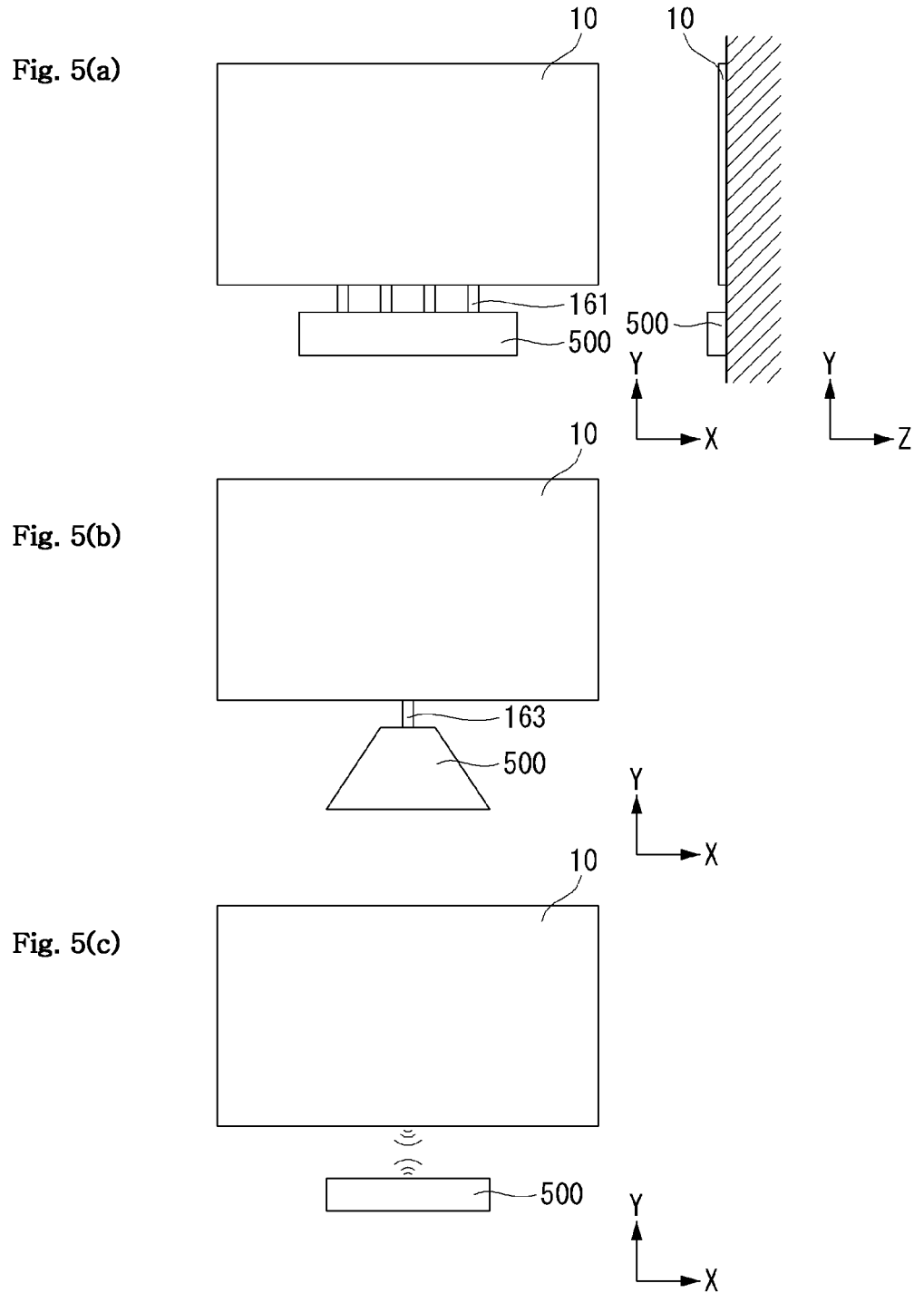

SPEAKER MODULE, ELECTRONIC DEVICE INCLUDING THE SPEAKER MODULE, AND DISPLAY DEVICE INCLUDING THE ELECTRONIC DEVICE

CROSS-REFERENCE TO RELATED APPLICATION

Pursuant to 35 U.S.C. §119(a), this application claims the benefit of earlier filing date and right of priority to Korean Patent Application No. 10-2015-0164502, filed on Nov. 24, 2015, the contents of which are incorporated by reference herein in their entirety.

BACKGROUND

Field of the Disclosure

The present disclosure relates to a speaker module having speaker units disposed in different directions and capable of offsetting driving vibrations, an electronic device including the speaker module, and a display device including the electronic device.

Background

As the information society develops, a demand for a display device increases in various forms. In line with such a demand, various display devices, such as a liquid crystal display device (LCD), a plasma display panel (PDP), an electroluminescent display (LED), and a vacuum fluorescent display (VFD), have been recently researched and used.

In the various display devices, a display device using organic light-emitting diodes (OLED) is advantageous in that it has an excellent brightness characteristic and viewing angle characteristic and can be implemented as an ultra-thin type because it does not require a backlight unit, compared to the LCD.

SUMMARY

One object is to solve the aforementioned problems and other problems. Another object is to provide a speaker module having speaker units disposed in different directions and capable of offsetting driving vibrations, an electronic device including the speaker module, and a display device including the electronic device.

In accordance with one aspect, there is provided an electronic device, including a housing, a main board including a controller placed in the housing, and at least one speaker module placed in the housing. The at least one speaker module includes at least one first speaker unit disposed in a first direction and at least one second speaker unit disposed in a second direction different from the first direction and having at least one side of the at least one second speaker unit contacting with the at least one first speaker unit.

The at least one first speaker unit includes a first magnet placed at a back side of the at least one first speaker unit and a first cone paper placed at a front side of the at least one first speaker unit, and the at least one second speaker unit includes a second magnet placed at a back side of the at least one second speaker unit and a second cone paper placed at a front side of the at least one second speaker unit, a back surface of the first cone paper is placed in a front surface of the first magnet, and a back surface of the second cone paper is placed in a front surface of the second magnet, wherein the first cone paper of the at least one first speaker unit is oriented in the first direction, and the second cone paper of the at least one second speaker unit is oriented in the second direction.

The first direction and the second direction may be parallel to each other and in opposite directions.

The first and the second speaker units may not overlap with each other in the first and the second directions.

A front surface of the first cone paper of the first speaker unit and a front surface of the second cone paper of the second speaker unit may be placed on the same plane.

A barrier is between the at least one first speaker unit and the at least one second speaker unit, a first through hole is between the at least one first speaker unit and the at least one second speaker unit allowing for a first channel to connect a front side of the at least one first speaker unit with a front side of the at least one second speaker unit, and a second through hole is between the at least one first speaker unit and the at least one second speaker unit allowing for a second channel to connect a back side of the at least one first speaker unit with the back side of the at least one second speaker unit.

The housing may further include a first opening at the housing corresponding to the first channel and a second opening at the housing corresponding to the second channel.

The first opening and the second opening may be at different sides of the housing.

The first opening may be at the top of the housing, and the second opening may be at the bottom of the housing.

The first speaker unit and the second speaker unit may be alternately disposed in at least one of a horizontal direction and a vertical direction.

In accordance with another aspect, there may be disclosed a display device, including a display, a cable extending from the display, and an electronic device separated from the display and exchanges signals with the display through the cable. The electronic device includes a housing, a main board including a controller, and at least one speaker module placed in the housing. The at least one speaker module includes at least one first speaker unit disposed in a first direction and a second speaker unit disposed in a second direction different from the first direction and having at least one side contacting with at least one side of the at least one first speaker unit.

The speaker module may be plural. The speaker module may include a first speaker module placed at one end of the housing and a second speaker modules placed at another end of the housing.

The at least one first speaker unit includes a first magnet placed at a back side of the at least one first speaker unit and a first cone paper placed at a front side of the at least one first speaker unit, and the at least one second speaker unit includes a second magnet placed at a back side of the at least one second speaker unit and a second cone paper placed at a front side of the at least one second speaker unit, a back surface of the first cone paper is placed in a front surface of the first magnet, and a back surface of the second cone paper is placed in a front surface of the second magnet, wherein the first cone paper of the at least one first speaker unit is oriented in the first direction, and the second cone paper of the at least one second speaker unit is oriented in the second direction.

A barrier is between the at least one first speaker unit and the at least one second speaker unit, a first through hole is between the at least one first speaker unit and the at least one second speaker unit allowing for a first channel to connect a front side of the at least one first speaker unit with a front side of the at least one second speaker unit, and a second through hole is between the at least one first speaker unit and the at least one second speaker unit allowing for a second channel to connect a back side of the at least one first speaker unit with the back side of the at least one second speaker unit.

The display device may further include a first opening at the housing corresponding to the first channel and a second opening at the housing corresponding to the second channel.

In accordance with yet another aspect, there may be disclosed a speaker module, including at least one first speaker unit disposed in a first direction, and at least one second speaker unit disposed in a second direction different from the first direction and having at least one side of the at least one second speaker unit contacting with at least one side of the at least one first speaker unit.

The first direction and the second direction may be parallel to each other and in opposite directions.

The first and the second speaker units may not overlap with each other in the first and the second directions.

The at least one first speaker unit includes a first magnet placed at a back side of the at least one first speaker unit and a first cone paper placed at a front side of the at least one first speaker unit, and the at least one second speaker unit includes a second magnet placed at a back side of the at least one second speaker unit and a second cone paper placed at a front side of the at least one second speaker unit, a back surface of the first cone paper is placed in a front surface of the first magnet, and a back surface of the second cone paper is placed in a front surface of the second magnet, wherein the first cone paper of the at least one first speaker unit is oriented in the first direction, and the second cone paper of the at least one second speaker unit is oriented in the second direction.

A barrier is between the at least one first speaker unit and the at least one second speaker unit, a first through hole is between the at least one first speaker unit and the at least one second speaker unit allowing for a first channel to connect a front side of the at least one first speaker unit with a front side of the at least one second speaker unit, a second through hole is between the at least one first speaker unit and the at least one second speaker unit allowing for a second channel to connect a back side of the at least one first speaker unit with the back side of the at least one second speaker unit, a first opening at the housing corresponds to the first channel, and a second opening at the housing corresponds to the second channel.

An advantage of the speaker module, the electronic device including the speaker module, and the display device including the electronic device according to an embodiment of the present invention is described below.

In accordance with at least one of the embodiments of the present invention, there is an advantage in that driving vibrations can be offsetted because the speaker units are disposed in different directions.

An additional scope of the applicability of the present invention will become evident from the following detailed description. However, various changes and modifications may be evidently understood by those skilled in the art within the spirit and scope of the present invention, and thus it is to be understood that the detailed description and a specific embodiment, such as a preferred embodiment of the present invention, are only illustrative.

BRIEF DESCRIPTION OF THE DRAWINGS

FIGS. 1, 2, 3, 4(a), 4(b), 4(c), 4(d), 5(a), 5(b), 5(c), 6(a), 6(b), 7, 8(a), and 8(b) are diagrams showing a display device according to various embodiments of the present invention;

DETAILED DESCRIPTION OF THE EMBODIMENTS

Figure 1:
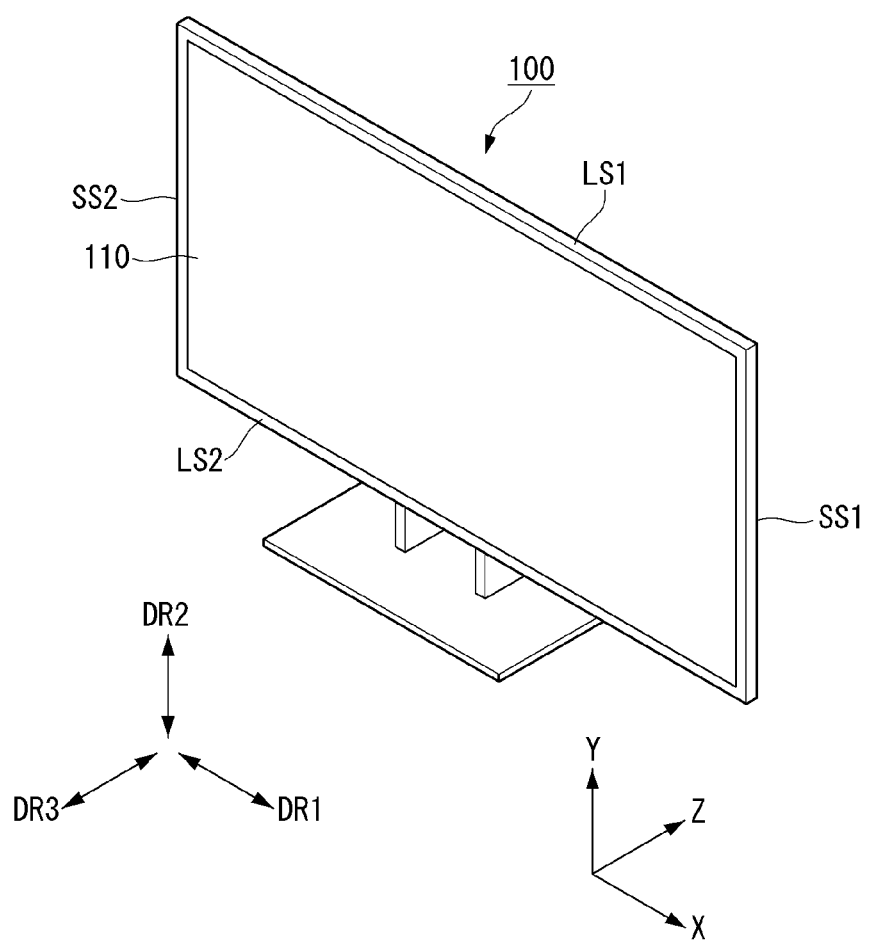

Hereinafter, embodiments disclosed in this specification are described in detail with reference to the accompanying drawings. The same or similar constituent elements may be assigned the same or similar reference numerals regardless of reference numerals, and redundant descriptions thereof may be omitted. It is to be noted that the suffixes of constituent elements used in the following description, such as "module" and "unit," are assigned or interchangeable with each other by taking into consideration only the ease of writing this specification, but in themselves are not particularly given distinct meanings and roles. Furthermore, in describing the embodiments disclosed in this specification, a detailed description of the known technologies may be omitted if it is deemed to make the gist of the present invention unnecessarily vague. Furthermore, it is to be understood that the accompanied drawings are intended to make easily understood the embodiments disclosed in this specification and the technical spirit disclosed in this specification is not restricted by the accompanying drawings and that the embodiments include all modifications, equivalents, and substitutions which fall within the spirit and technical scope of the present invention.

Hereinafter, a display panel is described by taking an organic light-emitting diode (OLED) display device as an example, but a display panel applicable to an embodiment of the present invention is not limited thereto and may include a liquid crystal display (LCD) device, a plasma display panel (PDP), and a field emission display (FED).

FIGS. 1, 2, 3, 4(a), 4(b), 4(c), 4(d), 5(a), 5(b), 5(c), 6(a), 6(b), 7, 8(a), 8(b), 9(a), 9(b), 9(c), 9(d), 9(e), 9(f), 10(a) and 10(b) are diagrams showing the configuration of a display device related to various embodiments of the present invention.

As shown in FIG. 1, hereinafter, a display panel 100 may include a first long side LS1, a second long side LS2 opposite the first long side LS1, a first short side SS1 neighboring the first long side LS1 and the second long side LS2, and a second short side SS2 opposite the first short side SS1.

In this case, the area of the first short side SS1 may be called a first side area. The area of the second short side SS2 may be called a second side area opposite the first side area. The area of the first long side LS1 may be called a third side area which neighbors the first side area and the second side area and which is placed between the first side area and the second side area. The area of the second long side LS2 may be called a fourth side area which neighbors the first side area and the second side area, which is placed between the first side area and the second side area, and which is opposite the third side area.

Furthermore, for convenience of description, the length of the first or second long side LS1 or LS2 has been illustrated as being longer than the length of the first or second short side SS1 or SS2, but the length of the first or second long side LS1 or LS2 may be approximately the same as the length of the first or second short side SS1 or SS2.

Furthermore, hereinafter, a first direction DR1 may be a direction parallel to the long side LS1, LS2 of the display panel 100, and a second direction DR2 may be a direction parallel to the short side SS1, SS2 of the display panel 100.

A third direction DR3 may be a direction orthogonal to the first direction DR1 and/or the second direction DR2.

The first direction DR1 and the second direction DR2 may be called a horizontal direction and vertical direction, respectively.

Furthermore, the third direction DR3 may be called an orthogonal direction.

Figure 2:
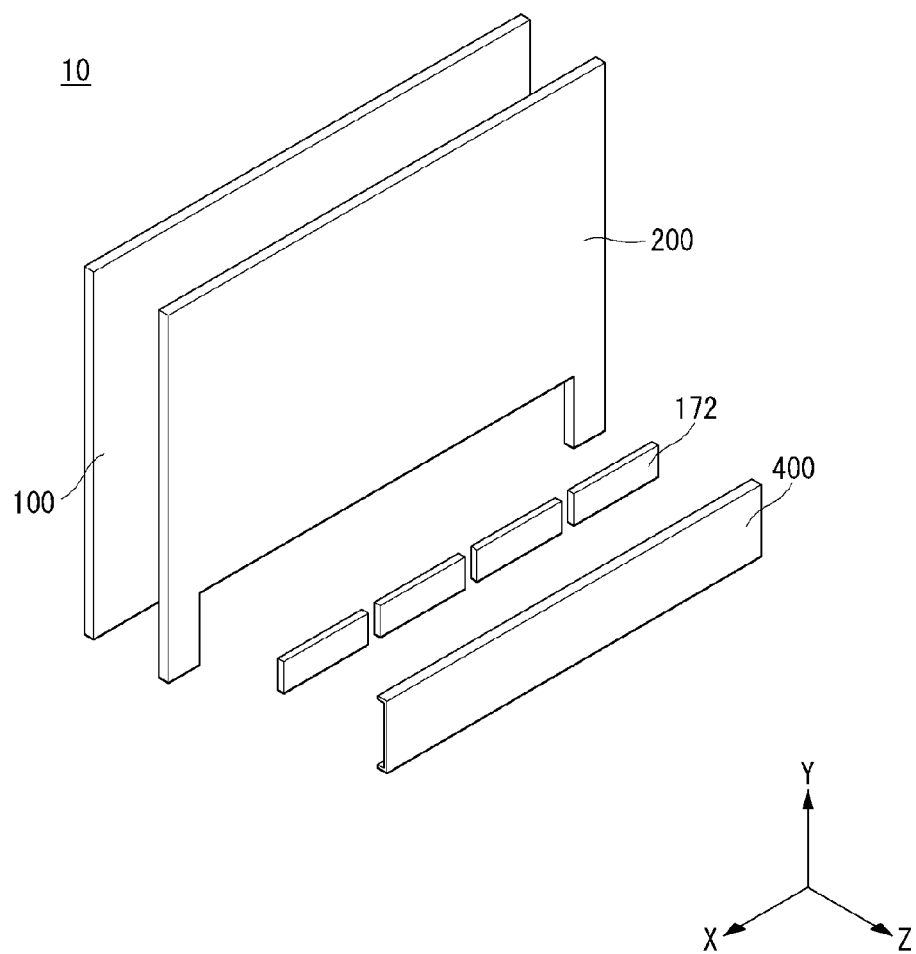

Referring to FIG. 2, the display head 10 of the display device according to an embodiment of the present invention may include the display panel 100, a module cover 200, and a PCB cover 400.

The display panel 100 is provided at the front of the display head 10, and may display an image. The display panel 100 may include of plurality of pixels, and the display device may divide an image into a plurality of pixels, may control the pixels so that each pixel emits light according to its color, luma, and chroma, and thereby displaying an image.

The display panel 100 may have a rectangular shape, but the present invention is not limited thereto. The display panel 100 may have a shape having specific curvature at its edges. The display panel 100 may be an organic light-emitting diode (OLED) panel, but the present invention is not limited thereto. For example, the display panel 100 may be an LCD panel.

The module cover 200 may be provided at the back surface of the display panel 100. The module cover 200 may be directly attached to the display panel 100. The module cover 200 may support the back surface of the display panel 100. Thus the module cover 200 can reinforce the stiffness of the display panel 100. Accordingly, the module cover 200 may include a material which is light and has high strength. For example, the module cover 200 may include aluminum.

Source PCBs 172 may be attached to the lower area of the module cover 200. In order to secure an area in which the source PCBs 172 will be placed, a hole (opening) may be formed in the area of the module cover 200 and in which the source PCBs 172 will be placed. If too many through holes or holes are formed in the module cover 200, a crack may be formed in the module cover 200 or the stiffness of the module cover 200 may become weak. Accordingly, a small number of through holes or holes should be formed in the module cover 200.

Signal lines for sending digital video data and timing control signals from a timing controller board may be placed in the source PCB 172. The source PCB 171 may be connected to the display panel 100 by a source chip on film (COF).

The source COF may be electrically connected to the source PCB 172 and the data pads of the display panel 100. A data integrated circuit may be mounted on the source COF.

The PCB cover 400 may be provided at the back surface of the area in which the source PCBs 172 have been placed. The PCB cover 400 may prevent the source PCB 172 from being exposed to the outside. For example, the PCB cover 400 may be opaque so that the source PCB 172 is not visible to the outside.

The PCB cover 400 may include an insulating material for preventing the source PCB 172 from being interfered by other electronic devices. For example, the PCB cover 400 may include a plastic material. Accordingly, the PCB cover 400 can protect the source PCB 172 against the leakage current.

In the display head 10 of the display device according to an embodiment of the present invention, the display panel 100 may be supported by only the module cover 200. That is, the display head 10 may not include another cover other than the module cover 200. Accordingly, a user can feel that the thickness of the display head 10 is very thin and can focus more on the display screen.

Figure 3:
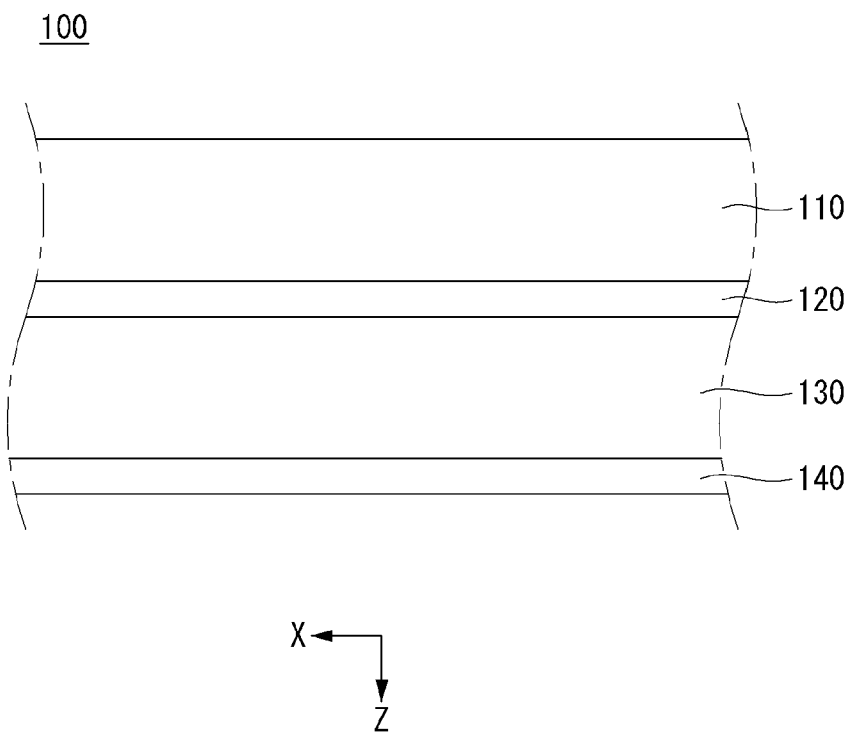

Referring to FIG. 3, the display panel 100 may include a transparent substrate 110, an upper electrode 120, an organic light-emitting layer 130, and a lower electrode 140. The transparent substrate 110, the upper electrode 120, the organic light-emitting layer 130, and the lower electrode 140 may be sequentially formed.

The transparent substrate 110 and the upper electrode 120 may include transparent materials. The lower electrode 140 may include a non-transparent material, but the present invention is not limited thereto. For example, the lower electrode 140 may include a transparent material (e.g., ITO). In this case, light pass through the lower electrode 140.

When a voltage is applied to the upper and lower electrodes 120 and 140, light emitted from the organic light-emitting layer 130 may penetrate the upper electrode 120 and the transparent substrate 110 and may be outputted to the outside. In this case, in order to output the light, reflected from the lower electrode 140, to the front surface, a light-shield plate may be further formed behind the lower electrode 140.

The display panel 100 according to an embodiment of the present invention may be an OLED display device. Accordingly, a separate light source is not required, and the volume and weight of the display panel 100 can be reduced. Furthermore, an OLED display device may not leave a residual image (e.g., phantom image) when displaying an image because it has response speed 1000 times faster than that of an LCD.

Referring to FIGS. 4(a)-4(d), in the display device according to an embodiment of the present invention, the display panel 100 and the back cover 200 may be attached through an adhesive sheet 350. The adhesive sheet 350 may include a double-sided tape whose both sides can be combined.

The adhesive sheet 350 may have a thickness. Accordingly, an alien substance or dust may enter between the display panel 100 and the back cover 200. In order to prevent an alien substance or dust from entering between the display panel 100 and the back cover 200, as shown in FIG. 4(a), a sealing member 183 may be used to seal at least one side of the adhesive sheet 350. The sealing member 183 may shield one or more sides of the adhesive sheet 350 and the display panel 100 at the same time.

As another example, as shown in FIG. 4(b), a frame 187 may be inserted into at least one side of the adhesive sheet 350. The frame 187 may come into contact with at least one side of the adhesive sheet 350 and may have one end indented in such a way as to over an end of the display panel 100. Accordingly, one or more sides of the display panel 100 can be shielded at the same time.

As yet another example, as shown in FIG. 4(c), a middle cabinet 193 may be placed between the display panel 100 and the back cover 200. The middle cabinet 193 may guide the location in which the display panel 100 is coupled. The flange 193a of the middle cabinet 193 may be inserted between the display panel 100 and the back cover 200. The body part of the middle cabinet 193 may shield one or more sides of the display panel 100 and the back cover 200 at the same time.

The flange 193a of the middle cabinet 193 may be spaced apart from the adhesive sheet 350. Accordingly, the amount of the adhesive sheet 350 necessary when the display device is fabricated can be reduced because the adhesive sheet 350 does not need to be generally placed completely in the display panel 100.

As yet another example, as shown in FIG. 4(d), the edge portion of the back cover 200 may be bent toward the display panel 100. At least one side of the adhesive sheet 350 can be shielded from the outside because the edge portion of the back cover 200 is bent toward the display panel 100.

In this case, a separate material need not be included between the display panel 100 and the back cover 200. Accordingly, a process for manufacturing the display device can be simplified, and a cost can be reduced. Furthermore, the edge of the back cover 200 can be spaced apart from the adhesive sheet 350. Accordingly, the amount of the adhesive sheet 350 necessary when the display device is fabricated can be reduced because the adhesive sheet 350 does not need to be generally placed completely in the display panel 100.

In embodiments to be described later, structures placed on the side of the adhesive sheet 350 are omitted, for convenience of description. The structures placed on the side of the adhesive sheet 350 may also be applied in other embodiments.

Referring to FIGS. 5(a)-5(c), the display device according to an embodiment of the present invention may include an electronic device 500 electrically connected to the display head 10.

The electronic device 500 may send at least one signal to the display head 10. The electronic device 500 may shield elements for driving the display device. For example, the electronic device 500 may shield at least one printed circuit board (PCB) including a controller to send the at least one signal. A detailed structure and method for coupling the at least one PCB are described later.

The electronic device 500 may be spaced apart from the display head 10 without coming into contact with the display head 10. Thus the electronic device 500 may not be placed in a portion on which a display screen is displayed. Accordingly, a user can more focus his or her attention on a display screen.

As an example, as shown in FIG. 5(a), the electronic device 500 may be connected to the display head 10 through at least one flat cable 161. The flat cable 161 may be a flat flex cable (FFC). The FFC is advantageous in that it is cheaper than other cables. The display head 10 and the flat cable 161 may include a plurality of signal connection terminal pins and at least one ground terminal pin for coupling the electronic device 500 and the display head 10.

As another example, as shown in FIG. 5(b), the electronic device 500 may be coupled to the display head 10 through a single circular cable 163. The electrical signals connected to several flat cables 161 in FIG. 5(a) can be coupled through the single circular cable 163. A user can feel that an external appearance of the display device is neater because the electronic device 500 and the display head 10 are coupled by the single circular cable 163 rather than a plurality of cables.

As yet another example, as shown in FIG. 5(c), the electronic device 500 and the display head 10 may wirelessly exchange electrical signals. In this case, a user can feel that the external appearance of the display device is more neat compared to the case where the electronic device 500 and the display head 10 are coupled through the flat cable 161 or the circular cable 163.

In the display device according to an embodiment of the present invention, the display head 10 and the electronic device 500 may have been spaced apart from each other. Accordingly, a user can focus more on a display screen, and a display device having a thinner display head 10 can be implemented.

Figure 6A:
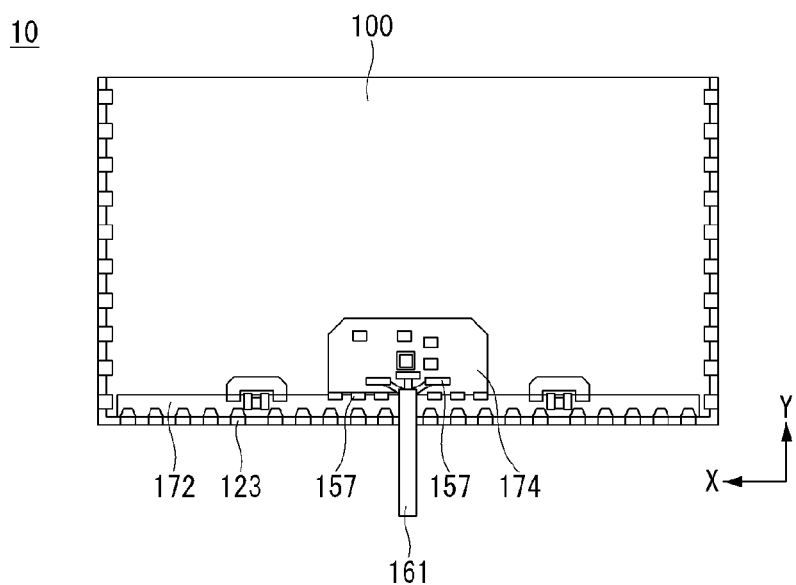

As shown in FIG. 6(a), an FPC board 174 may be placed in the central part of the display panel 100. The FPC board 174 may be connected to the flat cable 161 through connectors 157 included in the FPC board 174. The flat cable 161 connected to the FPC board 174 may also be placed in the central part of the display panel 100 because the FPC board 174 is placed in the central part of the display panel 100.

Various driving integrated circuits (ICs) may be mounted on the FPC board 174. The driving ICs may send and receive data between the source PCB and the housing. For example, the driving IC may be a serializer/deserializer (SERDES) IC. The SERDES IC may convert serial data/parallel data, exchanged within a chip, into parallel data/serial data. Accordingly, the SERDES IC can increase the transmission of a signal.

Figure 6B:
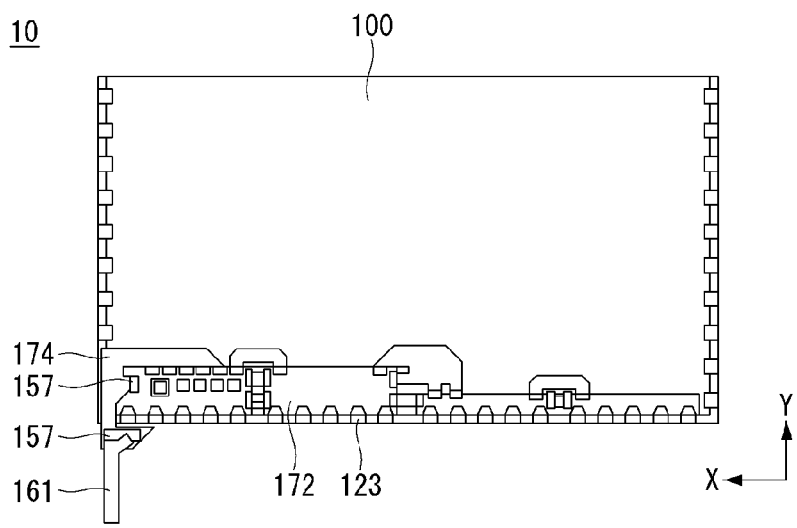

As shown in FIG. 6(b), the FPC board 174 may be placed on one side of the display panel 100. Accordingly, the flat cable 161 connected to the FPC board 174 may also be placed on one side of the display panel 100. A user can focus more on the display screen when watching the screen because the flat cable 161 is placed on one side of the display panel 100.

Furthermore, in the present embodiment, one side of the FPC board 174 may protrude to the outside of the display panel 100. This means that one side of the FPC board 174 may be protruded. Accordingly, the separation and coupling of the flat cable 161 can be facilitated due to the protruded portion of the FPC board 174.

In the present embodiment, the driving IC may be mounted on the source PCB 172. Accordingly, space can be reduced because the driving IC is not mounted on the FPC board 174.

The display device according to an embodiment of the present invention may be connected to the flat cable 161 through the FPC board 174. Accordingly, a lot of data can be transmitted faster and received by the driving IC mounted on the FPC board 174.

Figure 7:
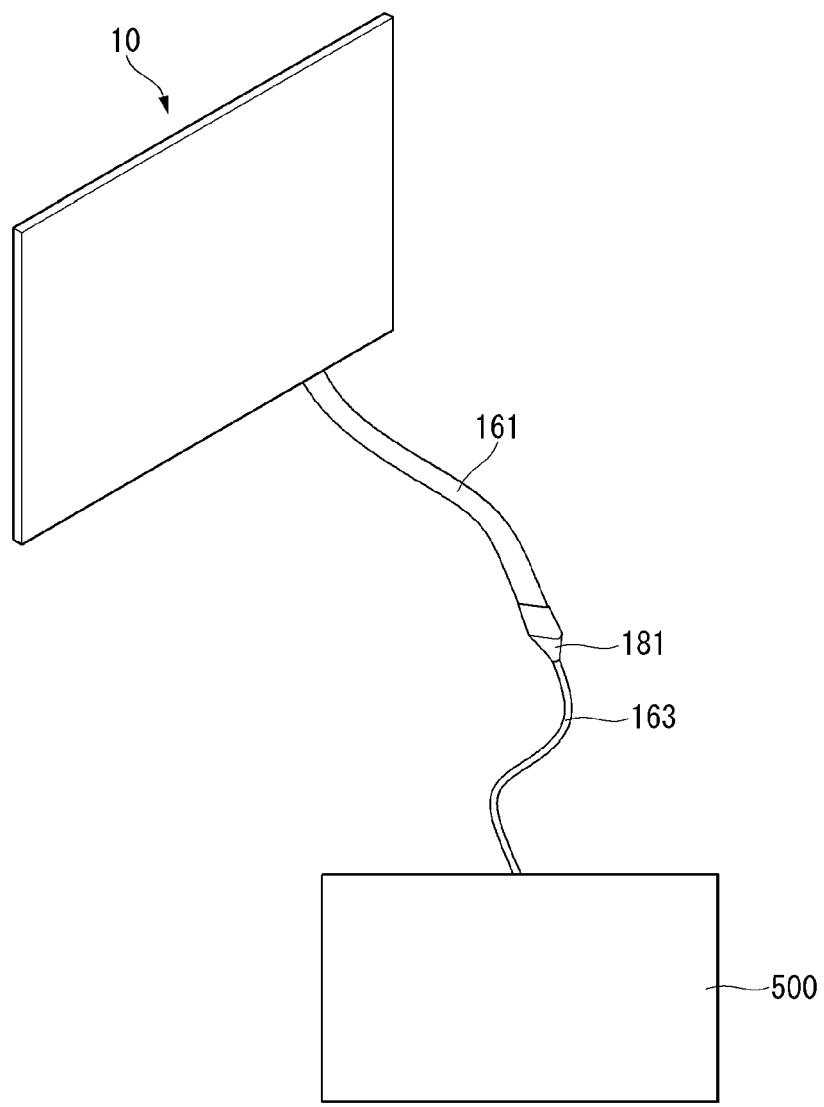

Referring to FIG. 7, the display head 10 and the electronic device 500 may be coupled through the flat cable 161 and the circular cable 163. The display head 10 and the electronic device 500 may transfer data through the flat cable 161 and the circular cable 163.

The circular cable 163 may have a very thick thickness and a large size. Accordingly, if the circular cable 163 is directly coupled to the display head 10 closely adhered to a to-be-attached surface, a user's view may be hindered. Furthermore, a user can feel that the display device is not closely adhered to a wall.

The flat cable 161 may not hinder a user's view when it is connected to the display head 10 because the flat cable 161 has a very thin thickness. Furthermore, a user can feel that the display device is closely adhered to a wall. However, the flat cable 161 may hinder a movement of the electronic device 500 because it has a thin thickness and droops low.

Accordingly, a portion adjacent to the display head may be connected through the flat cable 161, and a portion spaced apart from the display head 10 at a specific distance or greater may be connected through the circular cable 163.

The FPC cable 181 may be coupled between the flat cable 161 and the circular cable 163 so that the flat cable 161 and the circular cable 163 can be coupled. The FPC cable 181 may convert the locations of signal terminals and a power supply terminal within the flat cable 161 into the locations of signal terminals and a power supply terminal within the circular cable 163.

In the display device according to an embodiment of the present invention, in a portion adjacent to the display head 10, a signal may be transferred using the flat cable 161. In a portion adjacent to the electronic device 500, a signal may be transferred using the circular cable 163. Accordingly, a user can feel that the display head 10 is closely coupled to an attachment surface. Furthermore, there may no hindrance when the electronic device 500 is moved.

Figure 8A:
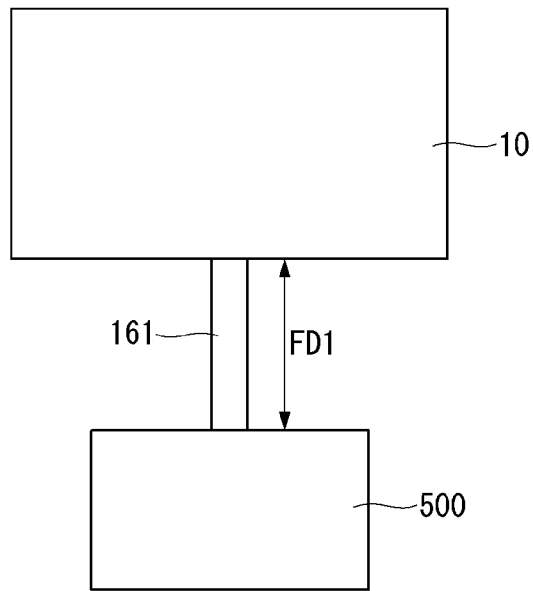
Figure 8B:
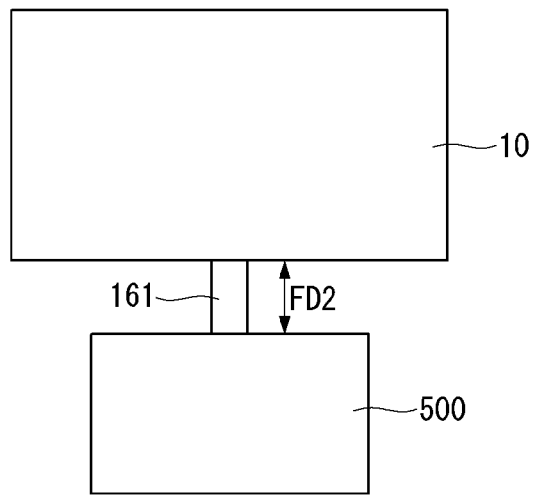

Referring to FIGS. 8(a)-8(b), in the display device according to an embodiment of the present invention, the length of the flat cable 161 that is externally exposed may be freely controlled. That is, the display device may be in any one of a first state in which the length of the flat cable 161 that is externally exposed is relatively long and a second state in which the length of the flat cable 161 that is externally exposed is relatively short.

As an example, as shown in FIG. 8(a), the display head 10 and the electronic device 500 may be spaced far apart from each other. In this case, the length FD1 of the flat cable 161 that is externally exposed may be relatively long. Thus the display device is in the first state. A user can focus more on the display screen of the display head 10 because the display head 10 and the electronic device 500 are spaced apart from each other.

As shown in FIG. 8(b), the display head 10 and the electronic device 500 may be closely placed. Thus the display device is in the second state. In this case, the length FD2 of the flat cable 161 that is externally exposed may be relatively short. A user may feel that an external appearance is neater because the length FD2 of the flat cable 161 that is externally exposed is short. Furthermore, the danger of the flat cable 161 being twisted may be reduced because the length FD2 of the flat cable 161 that is externally exposed is short.

In the display device according to an embodiment of the present invention, the length of the flat cable 161 that is externally exposed can be freely controlled. Accordingly, a user can dispose the display head 10 and the electronic device 500 as he or she wants.

FIGS. 9(a) to 9(f) are diagrams showing a display device according to an embodiment of the present invention.

Figure 9A:
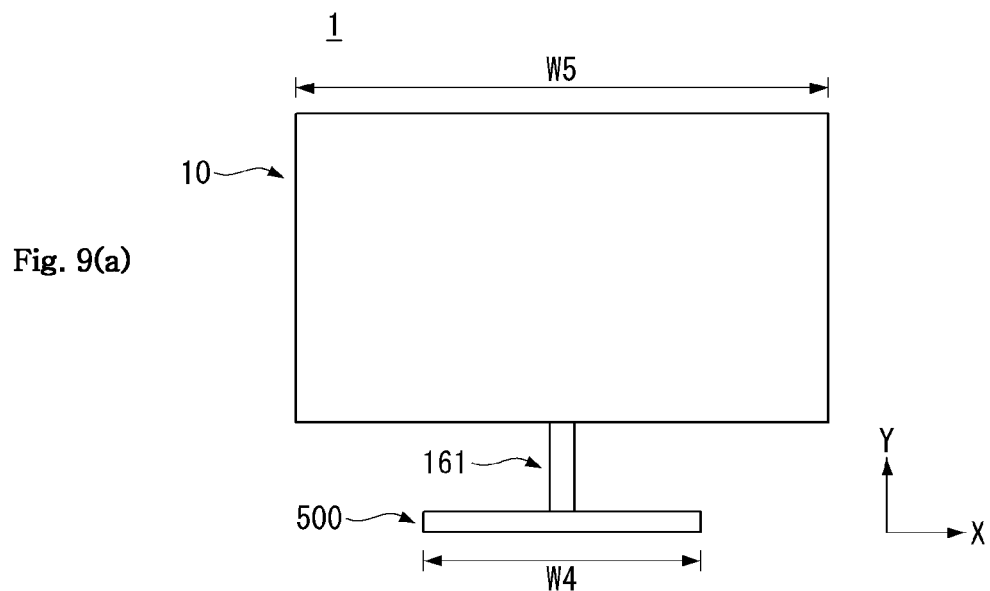
FIGS. 9a, 9(b), 9(c), 9(d), 9(e) and 9(f) are diagrams showing a display device according to various embodiments of the present invention.

As shown in FIG. 9(a), the display device 1 according to an embodiment of the present invention may include a display head 10, a cable 161 extending from the display head 10, and an electronic device 500 separated from the display head 10.

The display head 10 may be a portion on which an image is displayed. The display head 10 may not include a backlight unit. For example, the display head 10 may include an OLED panel which autonomously emits light. Accordingly, the display head 10 may be configured to be relatively light and thin.

The display head 10 may closely adhere to an attachment surface AS, such as a wall. For example, the entire surface of the back surface 12 of the display head 10 may closely adhere to the attachment surface AS. In this case, an emotional effect different from that of a prior art can be expected because the thin display head 10 closely adheres to the attachment surface AS.

The cable 161 may have one end extending from the display head 10. The cable 161 extending from the display head 10 may function as a path for communication between the display head 10 and the electronic device 500.

The cable 161 may be a flat cable as described above. Accordingly, the cable 161 may closely adhere to the attachment surface AS. The cable 161 may be installed in the attachment surface AS in a sense of unity due to its flat shape.

The electronic device 500 may have been connected to the other end of the cable 161. The electronic device 500 may send an electrical signal to the display head 10 through the cable 161.

The electronic device 500 may function as an AV box. For example, the electronic device 500 may receive various types of content, such as a broadcast signal, from the outside based on user manipulation, may output an image to the display head 10 through the cable 161, and may output a sound to a speaker module (for example, 600 of FIGS. 10(a) and 10(b)) embedded in the electronic device 500. The electronic device 500 may comprise an image signal module to output the image to the display head 10.

The electronic device 500 may have a box shape. For example, various electronic parts of the electronic device 500 may be included in a body of a hexahedron shape.

Figure 9B:
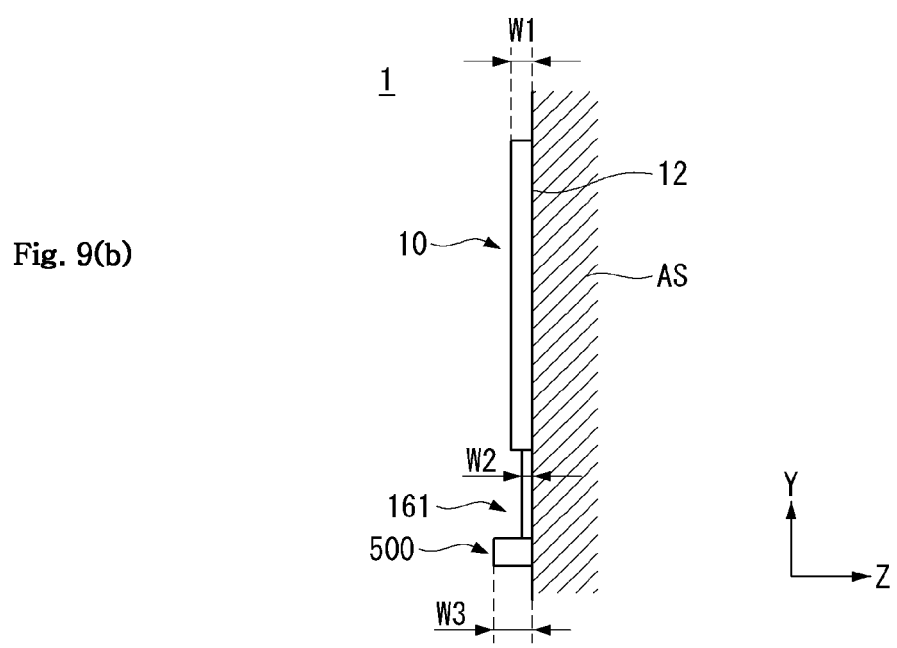

The electronic device 500 may be configured to be small to the fullest for the purpose of a sense of unity with the display head 10 which is thin and light and is closely attached to the surface of a wall. For example, as shown in FIG. 9(b), if the display head 10 has a first thickness W1, the cable 161 may have a second thickness W2 smaller than the first thickness W1, and the electronic device 500 may have a third thickness W3. The third thickness W3 may be greater than the first thickness W1 of the display head 10. For example, if the display head 10 has a first width W5, the electronic device 500 may have a second width W4 smaller than the first width W5. That is, the electronic device 500 may have a thicker thickness than the display head 10, but may have a smaller width than the display head 10. Since the electronic device 500 has a small size, the size of various parts embedded in the electronic device 500 may need to be reduced.

Figure 9C:
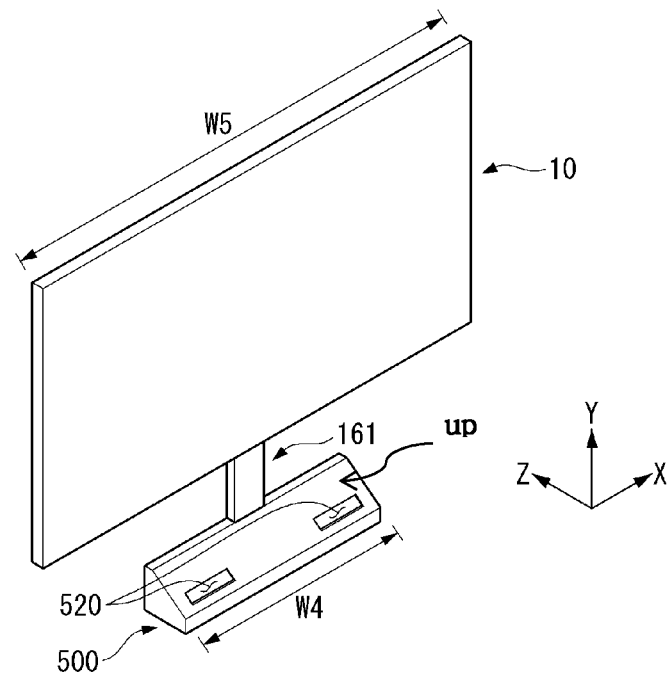
Figure 9D:
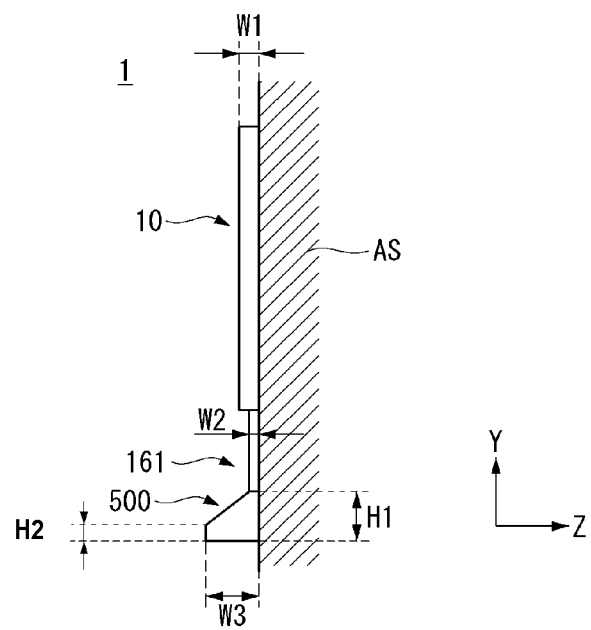
Figure 9E:
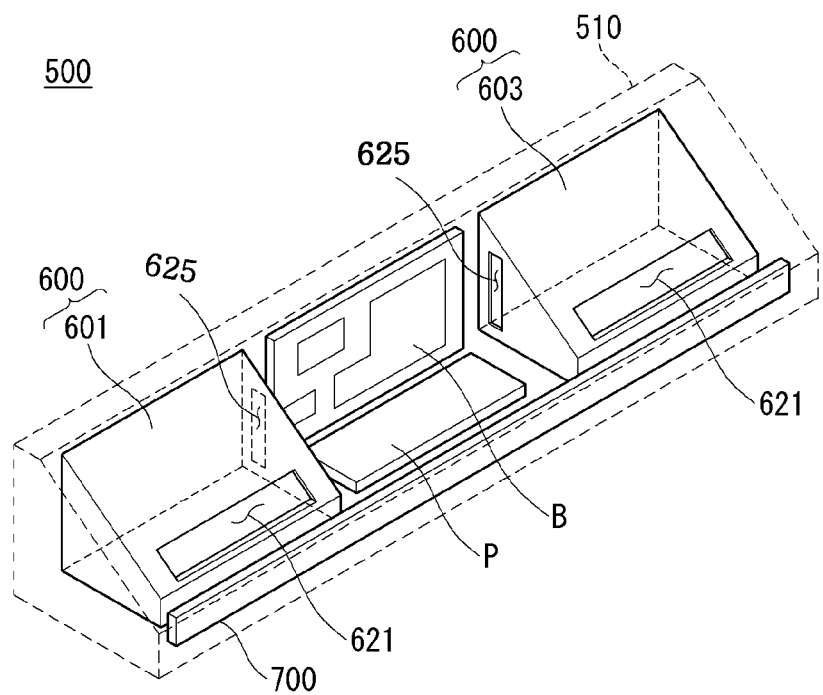
Figure 9F:
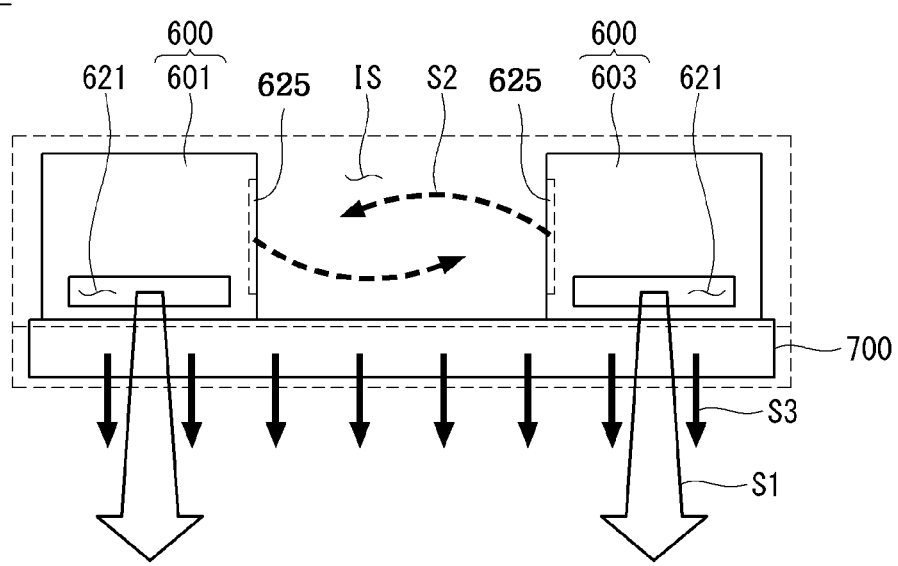
Figure 10A:
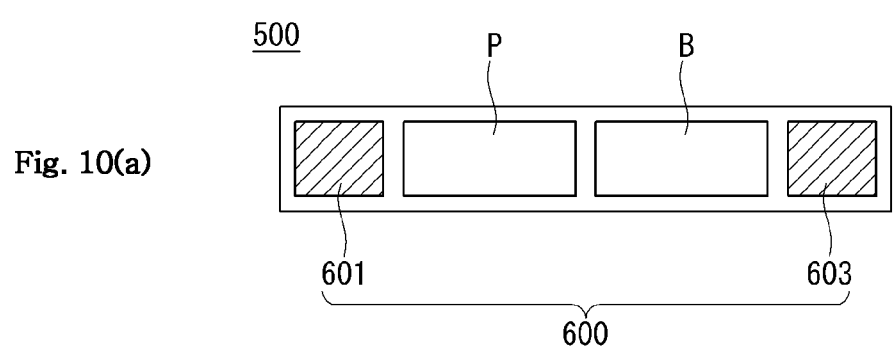
FIGS. 10(a), 10(b) and 11 are diagrams showing an electronic device according to various embodiments of the present invention.
Figure 10B:
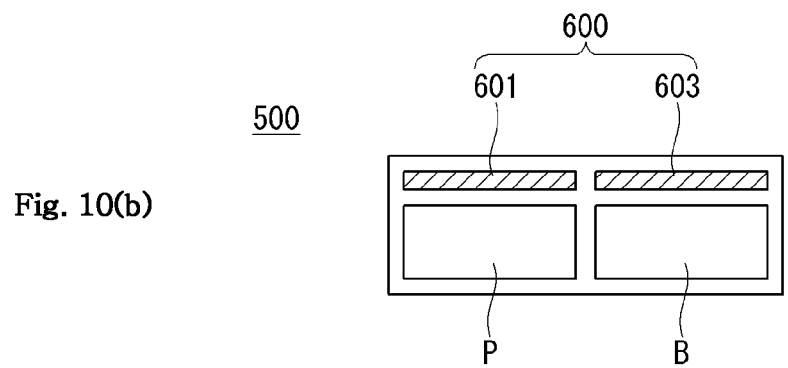

As shown in FIGS. 9(c)-9(d), the electronic device 500 may be configured to have a diamond cross-sectional shape. For example, the first height H1 of a portion coming into contact with the attachment surface AS may be greater than the second height H2 of the end of the electronic device 500.

At least one housing opening 520 may be formed in the top surface UP of the electronic device 500. The at least one housing opening 520 may correspond to at least one of the first and the second openings (621 and 625 of FIG. 9(e)) of the speaker module (600 of FIG. 9(*e*)). At least some of the sound generated by the speaker module (600 of FIG. 9(*e*)) may be outputted through the at least one housing opening 520.

As shown in FIG. 9(*e*), various components may be embedded in the housing 510 of the electronic device 500. For example, a power supply circuit P, a main board B, a speaker module 600, and a tweeter 700 may have been embedded in the housing 510.

The speaker modules 600 may be spaced apart from each other within the housing 510. For example, the speaker modules 600 may include first and second speaker modules 601 and 603 placed at both ends of the housing 510.

Each of the first and the second speaker modules 601 and 603 may include a plurality of openings 621 and 625. For example, each of the first and the second speaker modules 601 and 603 may include a first opening 621 and a second opening 625.

The first and the second openings 621 and 625 may be placed in different faces of the first and second speaker modules 601 and 603. For example, the first opening 621 may be placed on a top surface of the speaker module 600 and the second opening 625 may be placed on a side or bottom surface of the speaker module 600.

The first and the second openings 621 and 625 may be channels from which different types of sound quality are outputted. For example, the first opening 621 may be the channel of a sound output from the front surface of a speaker and the second opening 625 may be the channel of a sound output from the back surface of a speaker.

The tweeter 700 may output a sound having a type different from the type of sound output by the speaker module 600. For example, the tweeter 700 may output a sound of a specific wavelength, such as a voice.

The tweeter 700 may have been placed on the front surface side of the housing 510. Accordingly, a sound of a specific wavelength, such as a voice, can be heard by a user more clearly.

The tweeter 700 may be a speaker using a piezoelectric element. Accordingly, the tweeter 700 may be configured to have a relatively thin shape. Accordingly, the internal space of the electronic device 500 can be used more efficiently.

As shown in FIG. 9(*f*), the sound of a first path S1 may be outputted through the first opening 621 of the speaker module 600, and the sound of a second path S2 may be outputted through the second opening 625.

The sound of the second path S2 may be outputted using the internal area IS of the electronic device 500 as a soundbox. That is, the internal area IS may be additionally used as a soundbox although the volume of the speaker module 600 itself is limited. The sound of a third path S3 may be the path of a sound made by the tweeter 700. The third path S3 may be a path toward the front side of the electronic device 500.

FIGS. 10(*a*)-10(*b*) and 11 are diagrams showing an electronic device according to various embodiments of the present invention.

As shown in FIGS. 10(*a*)-10(*b*) and 11, the electronic device 500 according to various embodiments of the present invention may be configured in various forms.

As shown in FIG. 10(*a*), the electronic device 500 may include the power supply circuit P, the main board B, and the speaker module 600.

The power supply circuit P may include a voltage/current transformer for an externally supplied power source. The power supply circuit P may provide power for the operations of the electronic device 500 and the display head 10.

The main board B may be a controller for the electronic device 500 and/or the display head 10. The main board B may include a single PCB or a plurality of PCBs.

The speaker module 600 may be embedded in the electronic device 500. That is, at least part of or the entire speaker module 600 may be seated in the electronic device 500. As described above, the electronic device 500 may be configured in a relatively slim form for the purpose of a design unity with the display head 10. Accordingly, the volume of the speaker module 600 embedded in the electronic device 500 may be limited.

Performance of the speaker module 600 may be determined by several factors. One of factors affecting performance of the speaker module 600 may be the volume of the speaker module 600. In other words, one of the factors may be the volume of a soundbox forming the speaker module 600. In order to obtain a specific sound quality and/or sound volume, the volume of the soundbox having a specific degree or higher may need to be secured. The speaker module 600 according to an embodiment of the present invention can secure maximum performance although it is embedded in the electronic device 500 of a limited size.

The number of speaker modules 600 may be plural. For example, the speaker module 600 may include the first and the second speaker modules 601 and 603. In order to obtain a stereo effect, the first and the second speaker modules 601 and 603 may be disposed at both ends of the electronic device 500.

As shown in FIG. 10(*b*), the location of the speaker module 600 may be the upper side and/or lower side of the electronic device 500 depending on a detailed shape of the electronic device 500.

Figure 11:
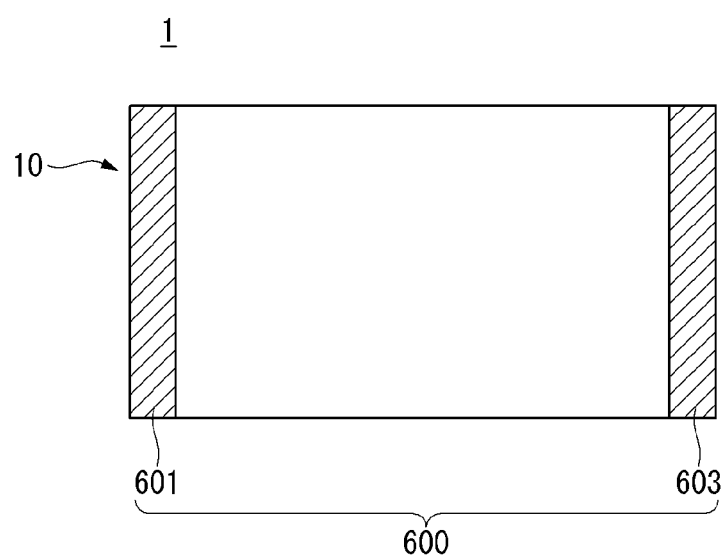

As shown in FIG. 11, the speaker module 600 may be configured to have a vertical shape. For example, the speaker modules 601 and 603 may be configured to have substantially the same size as the height of the display head 10 so that they are placed on the left and right of the display head 10.

Figure 12:
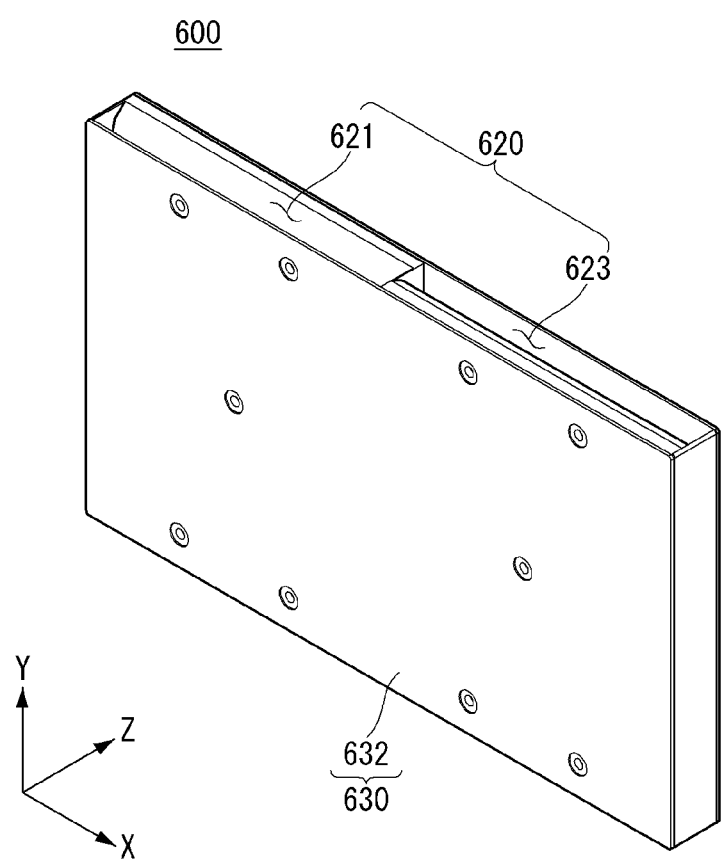
FIGS. 12 to 14 are diagrams showing the configuration of a speaker module according to an embodiment of the present invention.
Figure 13A:
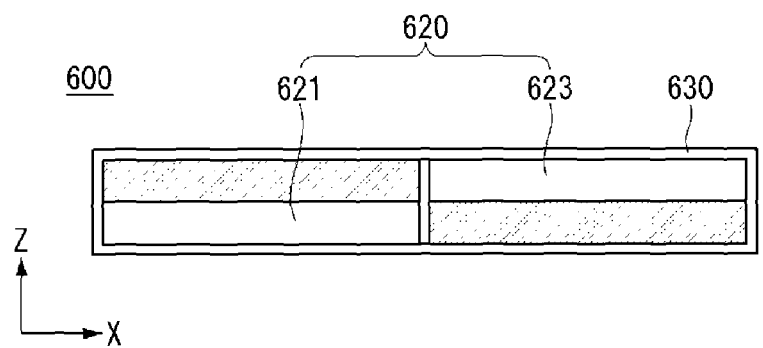
Figure 13B:
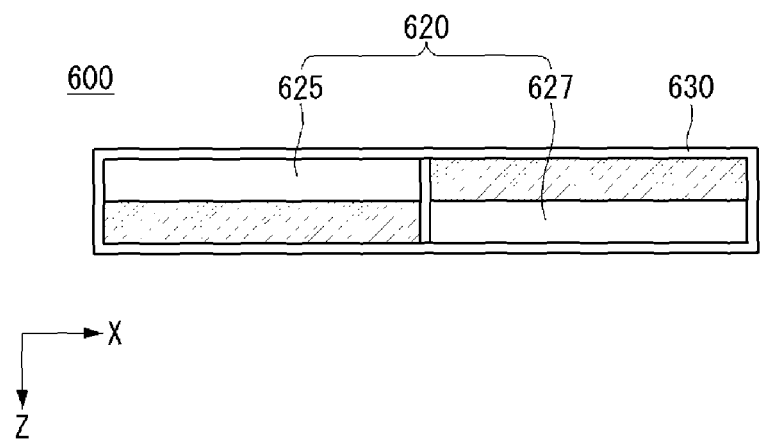

FIGS. 12, 13(*a*), 13(*b*), and 14 are diagrams showing the configuration of a speaker module according to an embodiment of the present invention.

As shown in FIGS. 12, 13(*a*), 13(*b*), and 14, the speaker module 600 according to an embodiment of the present invention may have been placed within a body 630.

The body 630 may be configured to have a hexahedron shape. One surface of the body 630 may be shielded by a first external surface 632 and a second external surface (634 of FIG. 14). A plurality of openings 620 may be formed in the body 630.

The opening 620 may be an area formed by removing at least some area of the body 630. At least part of the internal area of the body 630 may be exposed to the outside through the opening 620.

The opening 620 may be formed at the top and/or bottom of the body 630. For example, first and second openings 621 and 623 may be formed at the top surface of the body 630. Although not shown, the opening 620 may also be formed at the bottom surface of the body 630.

The opening 620 may be the output channel of a sound generated by a speaker unit (650 of FIG. 14) embedded in the body 630. A sound may be outputted to the outside of the speaker module 600 through the opening 620.

The opening 620 may have a different role depending on the location of the opening 620. For example, a first sound may be outputted through the first opening 621 and a second sound may be outputted through the second opening 623. The improvement of sound quality and/or a sound volume can be expected because different sounds are outputted according to the first opening 621 and the second opening 623.

FIG. 13(*a*) is a diagram showing the top surface of the speaker module 600. As shown in FIG. 13(*a*), the first and the second openings 621 and 623 may be formed in the top surface of the speaker module 600.

FIG. 13(*b*) is a diagram showing the bottom surface of the speaker module 600. As shown in FIG. 13(*b*), third and fourth openings 625 and 627 may be formed in the bottom surface of the speaker module 600. The third and the fourth openings 625 and 627 may be formed in locations corresponding to the first and the second openings 621 and 623. The third opening 625 may be formed under the first opening 621 and the fourth opening 627 may be formed under the second opening 623.

Figure 14:
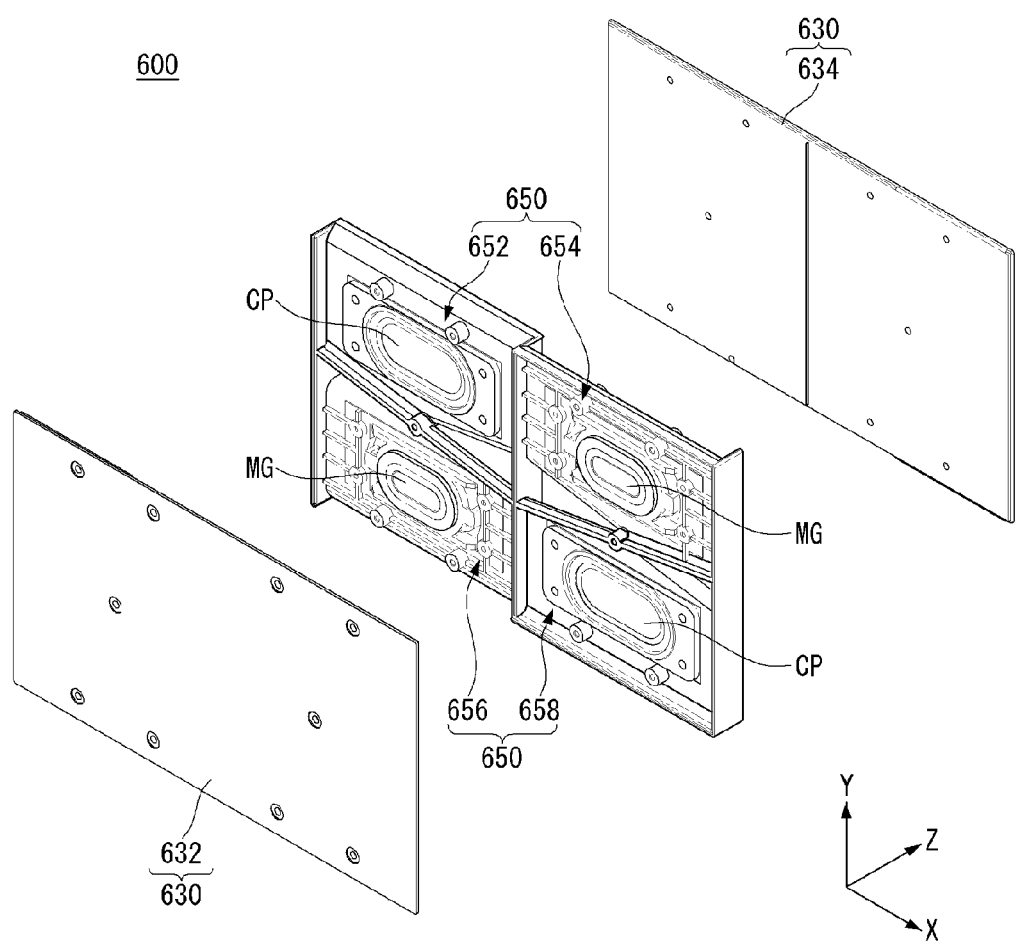

As shown in FIG. 14, the speaker unit 650 may be placed within the first and the second external surfaces 632 and 634 of the speaker module 600. The number of speaker units 650 may be plural. For example, the speaker unit 650 may include first to fourth speaker units 652, 654, 656, and 658.

At least one of the first to fourth speaker units 652, 654, 656, and 658 may be disposed to neighbor at least the other of the first to fourth speaker units 652, 654, 656, and 658. For example, one edge of the first speaker unit 652 may come into contact with one edge of the second speaker unit 654. Another edge of the first speaker unit 652 may come into contact with one edge of the third speaker unit 656.

The first to fourth speaker units 652, 654, 656, and 658 may not overlap each other in the thickness direction of the speaker module 600. That is, the first to fourth speaker units 652, 654, 656, and 658 may be disposed as not overlap each other in the direction in which the magnets MG and cone paper CP of the first to fourth speaker units 652, 654, 656, and 658 are connected. In other words, the first to fourth speaker units 652, 654, 656, and 658 are disposed to neighbor each other, but may be disposed as not overlap each other.

The direction of at least one of the first to fourth speaker units 652, 654, 656, and 658 may be different from the direction of at least the other of the first to fourth speaker units 652, 654, 656, and 658. For example, at least one of the first to fourth speaker units 652, 654, 656, and 658 may be disposed in the first direction and at least the other of the first to fourth speaker units 652, 654, 656, and 658 may be disposed in the second direction. For example, the cone paper CP of the first speaker unit 652 may be disposed toward the first external surface 632. The cone paper CP of the second speaker unit 654 may be disposed toward the second external surface 634. Thus, the magnet MG of the second speaker unit 654 may be disposed toward the first external surface 632. In other words, it may be said that the first speaker unit 652 and the second speaker unit 654 may be disposed in different directions. In other words, it may be said that the first speaker unit 652 may be disposed in the first direction and the second speaker unit 654 may be disposed in the second direction different from the first direction.

Speaker units that belong to the first to fourth speaker units 652, 654, 656, and 658 and that neighbor each other may be disposed in directions different from the directions of the others. In other words, it may be said that at least one speaker unit 652, 654, 656, and 658 that belongs to the plurality of speaker units 652, 654, 656, and 658 and that shares an edge along with a specific speaker unit has been disposed in a direction different from the direction of that specific speaker unit. For example, the first speaker unit 652 disposed in the first direction and the second and the third speaker units 654 and 656 disposed in the second direction may share an edge with the first speaker unit 652.

The first to fourth speaker units 652, 654, 656, and 658 may offset driving vibrations. For example, the driving vibration of the first speaker unit 652 and the driving vibration of the second speaker unit 654 may be same size but opposite phases. Driving vibrations having the same size but opposite phases may mutually offset and cancel each other.

Figure 15A:
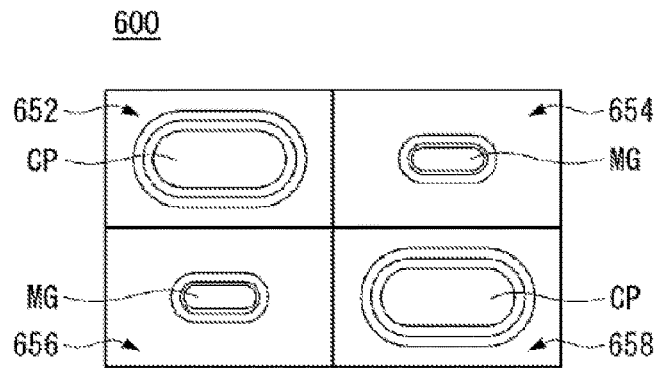
FIGS. 15(a), 15(b), 15(c) and 16 are diagrams showing the configurations of the speaker module according to various embodiments of the present invention.
Figure 15B:
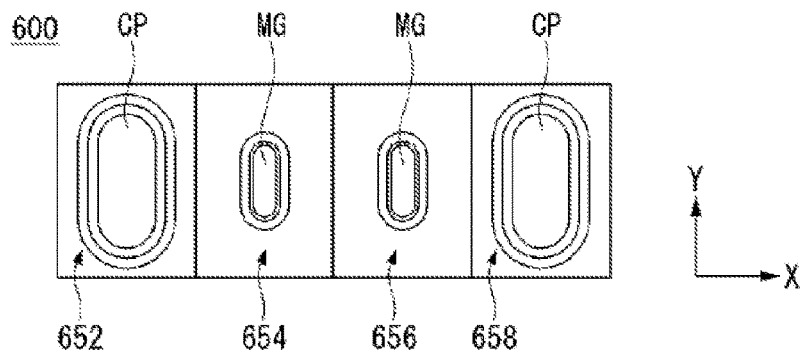
Figure 15C:
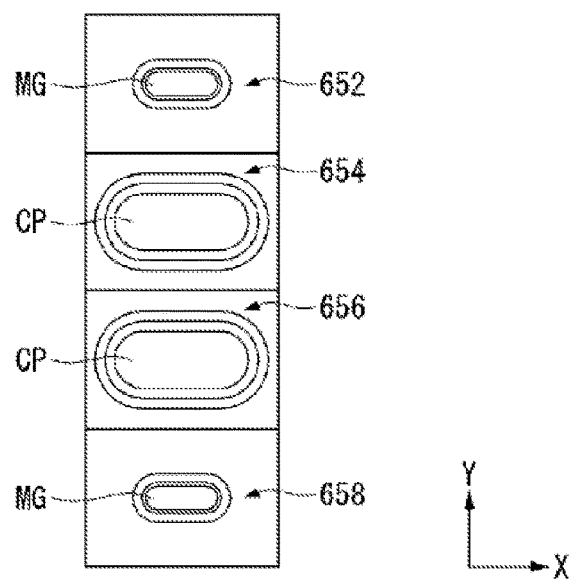

FIGS. 15(*a*), 15(*b*), 15(*c*), and 16 are diagrams showing the configurations of the speaker module according to various embodiments of the present invention.

As shown in FIGS. 15(*a*), 15(*b*), 15(*c*), and 16, the speaker module 600 according to various embodiments of the present invention may minimize driving vibrations because at least one speaker unit is disposed in a direction different from the direction of at least the other speaker unit.

As shown in FIG. 15(*a*), the cone paper CP of the first and the fourth speaker units 652 and 658 of the first to fourth speaker units 652, 654, 656, and 658 may be disposed to be seen (e.g., in the first direction), and the magnets MG of the second and the third speaker units 654 and 656 thereof may be disposed to be seen (e.g., in the second direction).

As shown in FIG. 15(*b*), the first to fourth speaker units 652, 654, 656, and 658 may be disposed in a horizontal direction (i.e., in a row). The first and the fourth speaker units 652 and 658 may be disposed in the first direction, and the second and the third speaker units 654 and 656 may be disposed in the second direction. This means that neighboring speaker units 650 may be disposed in different directions in such a way as to offset driving vibrations.

As shown in FIG. 15(*c*), the first to fourth speaker units 652, 654, 656, and 658 may be disposed in a vertical direction (i.e., in a column). The first and the fourth speaker units 652 and 658 may be disposed in the second direction, and the second and the third speaker units 654 and 656 may be disposed in the first direction.

Figure 16:
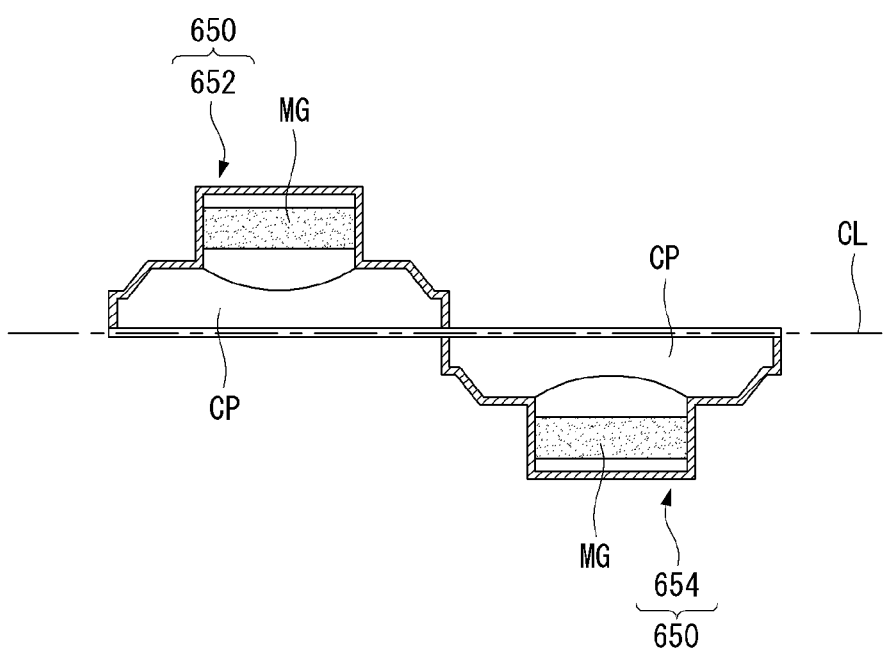

As shown in FIG. 16, the speaker units 650 may be disposed to oppose each other. For example, the first speaker unit 652 may be disposed on one side facing down and the second speaker unit 654 may be disposed on the other side facing up on the basis of a virtual reference line CL.

The speaker units 650 may share an edge area. For example, the edge area of the first speaker unit 652 may come into contact with the edge area of the second speaker unit 654. The edge areas of the first and the second speaker units 652 and 654 may come into contact with each other, but may not overlap each other.

Figure 17:
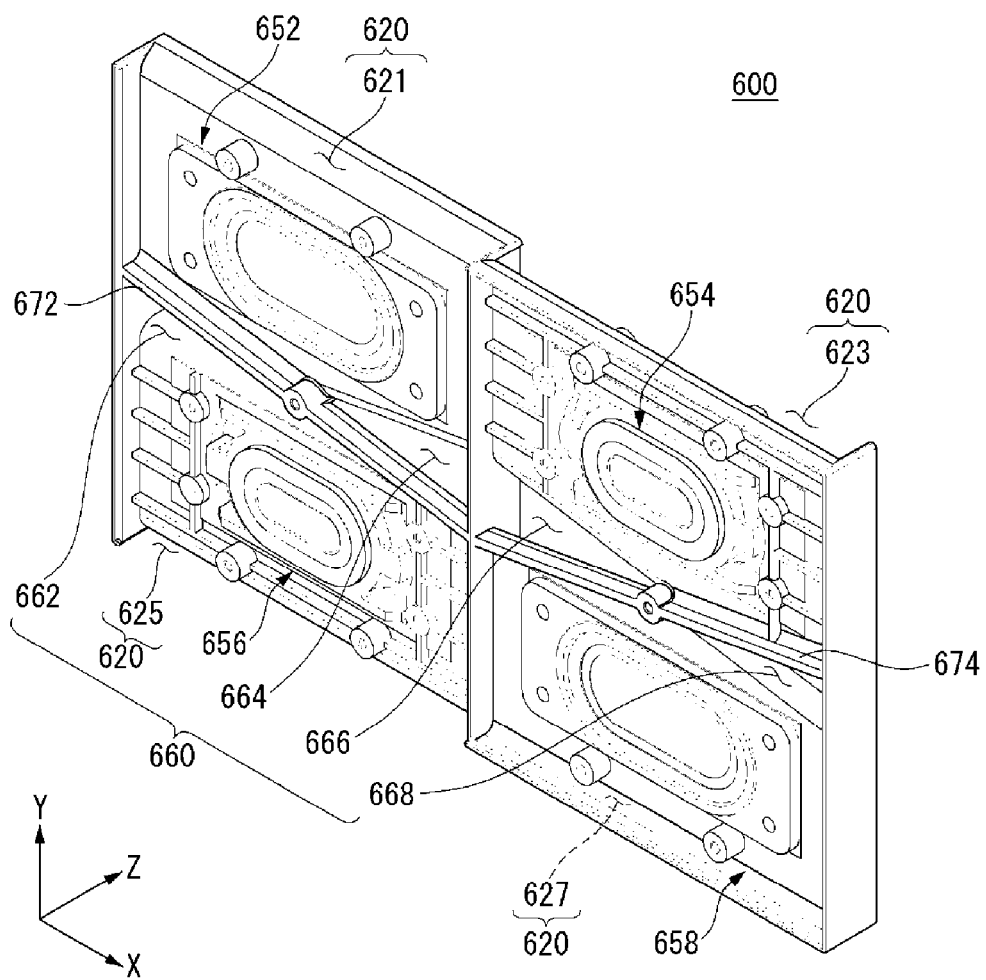
FIGS. 17 and 18 are diagrams showing a configuration and operation of the speaker module according to an embodiment of the present invention.
Figure 18:
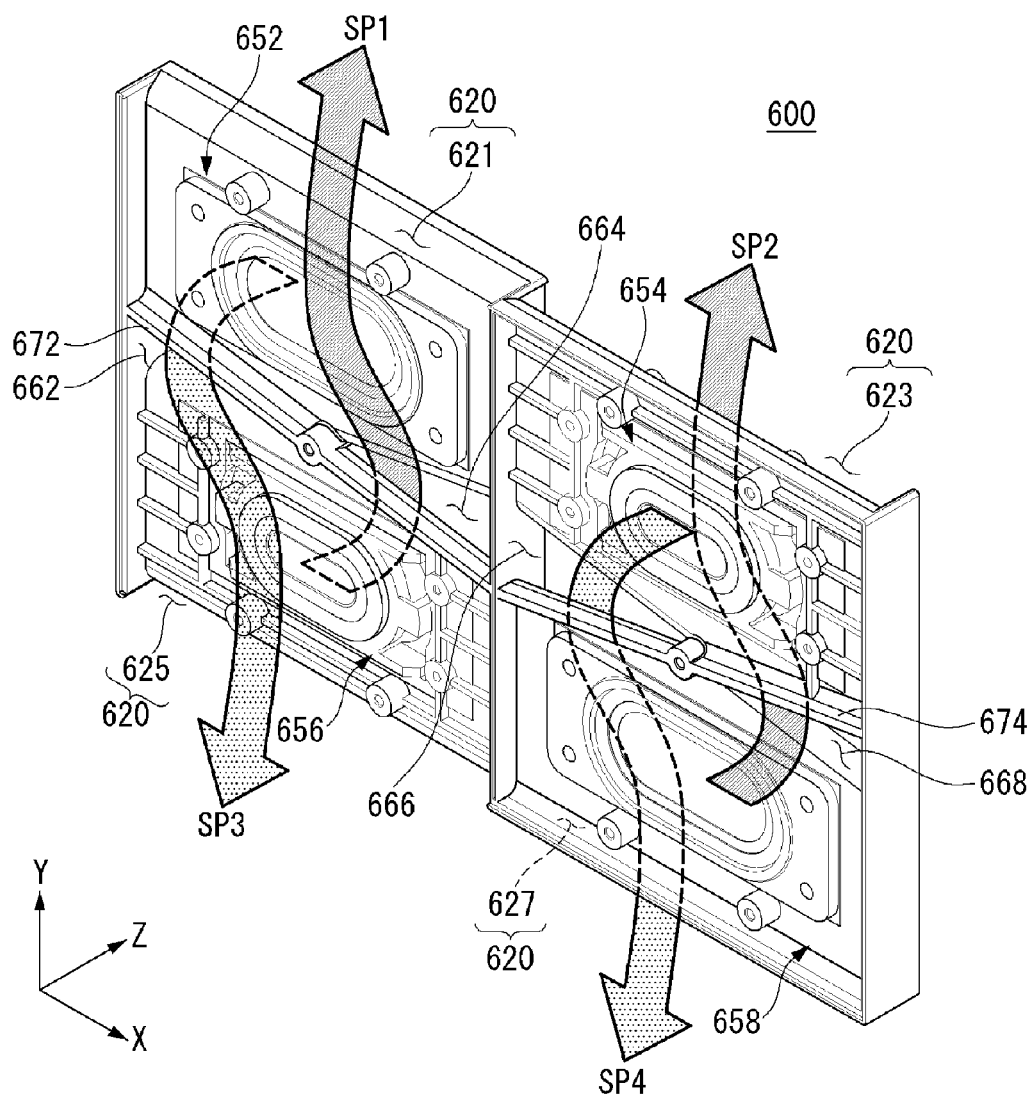

FIGS. 17 and 18 are diagrams showing a configuration and operation of the speaker module according to an embodiment of the present invention.

As shown in FIGS. 17 and 18, the speaker module 600 according to an embodiment of the present invention may include at least one opening 620. The speaker module 600 according to an embodiment of the present invention may include at least one through hole 660. The speaker module 600 according to an embodiment of the present invention may include one or more shield ribs 672 and 674.

As shown in FIG. 17, the opening 620 may be formed at the top surface and/or bottom surface of the speaker module 600. For example, the opening 620 may include the first and the second openings 621 and 623 at the top surface of the speaker module 600 and the third and the fourth openings 625 and 627 at the bottom surface of the speaker module 600. Each of the openings 621, 623, 625, and 627 may function as a channel through which a sound is outputted to the outside of the speaker module 600.

The opening 620 may determine the output direction of a sound. For example, the first and the second openings 621 and 623 may output sounds in the upward direction of the speaker unit 600, and the third and the fourth openings 625 and 627 may output sounds in the downward direction of the speaker unit 600.

The first and the second openings 621 and 623 and the third and the fourth openings 625 and 627 may output different sounds. For example, the first and the second openings 621 and 623 may be the diffusion channels of sounds discharged from the front surfaces of the first to fourth speaker units 652, 654, 656, and 658 and the third and the fourth openings 625 and 627 may be the diffusion channels of sounds discharged from the back surfaces of the first to fourth speaker units 652, 654, 656, and 658.

The through holes 660 may be formed on the inside of the speaker module 600. The through holes 660 may be placed on the channels of sounds generated by the first to fourth speaker units 652, 654, 656, and 658. Sounds generated by the plurality of speaker units may be merged into a single channel through the through holes 660. Accordingly, an advantage of increasing the volume of a soundbox can be expected. For example, regarding a sound output from the front surface of the third speaker unit 656, the narrow area of the front surface of the third speaker unit 656 may be the entire volume of the soundbox if the through hole 660 is not present. However, a sound output from the front surface of the third speaker unit 656 through the second through hole 664 of the through holes 660 according to an embodiment of the present invention may be outputted to the first opening 621 through the front surface of the first speaker unit 652. Accordingly, it may be seen that the volume of a soundbox has been increased by the moving path of the sound. Thus, the volume of the soundbox allocated to sounds generated from the front surfaces of the first and the third speaker units 652 and 656 has been doubled.

The through hole 660 may include first to fourth through holes 662, 664, 666, and 668. The first through hole 662 may connect the back surface of the first speaker unit 652 and the back surface of the third speaker unit 656. The second through hole 664 may connect the front surface of the first speaker unit 652 and the front surface of the third speaker unit 656. The third through hole 666 may connect the back surface of the second speaker unit 654 and the back surface of the fourth speaker unit 658. The fourth through hole 668 may connect the front surface of the second speaker unit 654 and the front surface of the fourth speaker unit 658. Thus the first to fourth through holes 662, 664, 666, and 668 may form a channel which connects at least one of the first to fourth speaker units 652, 654, 656, and 656 and at least the other of the first to fourth speaker units 652, 654, 656, and 656.

Barriers may be between the first to fourth speaker units. A barrier could be a side of a speaker unit. A barrier could be a shield rib. For example, the shield ribs 672 and 674 may be placed between the first to fourth speaker units 652, 654, 656, and 658. The shield ribs 672 and 674 may prevent a sound generated by a specific speaker unit from being mixed with a sound generated by a neighboring another speaker unit. That is, the shield ribs 672 and 674 may function to guide a sound so that it is diffused through a predetermined channel.

As shown in FIG. 18, first to fourth paths SP1 to SP4 may be formed through the first to fourth through holes 662, 664, 666, and 668. For example, the first path SP1 may be a path which is started at the front surface of the third speaker unit 656 and which passes through the first opening 621 via the second through hole 664 and the front surface of the first speaker unit 652.

The first and the second paths SP1 and SP2 may be paths toward the top of the speaker module 600. The third and the fourth paths SP3 and SP4 may be paths toward the bottom of the speaker module 600. The first and the second paths SP1 and SP2 may be paths through which sounds generated from the front surfaces of the first to fourth speaker units 652, 654, 666, and 668 pass. The third and the fourth paths SP3 and SP4 may be paths through which sounds generated from the back surfaces of the first to fourth speaker units 652, 654, 666, and 668 pass. Thus the direction of a sound and/or sound quality may be determined through the first to fourth paths SP1, SP2, SP3, and SP4. Furthermore, an advantage of increasing the volume of the soundbox is achieved because the first to fourth paths SP1, SP2, SP3, and SP4 are lengthily formed through the first to fourth through holes 660. Thus a small space can be efficiently used to the fullest.

FIG. 19 is a diagram showing a configuration and operation of the speaker module according to another embodiment of the present invention.

Figure 19A:
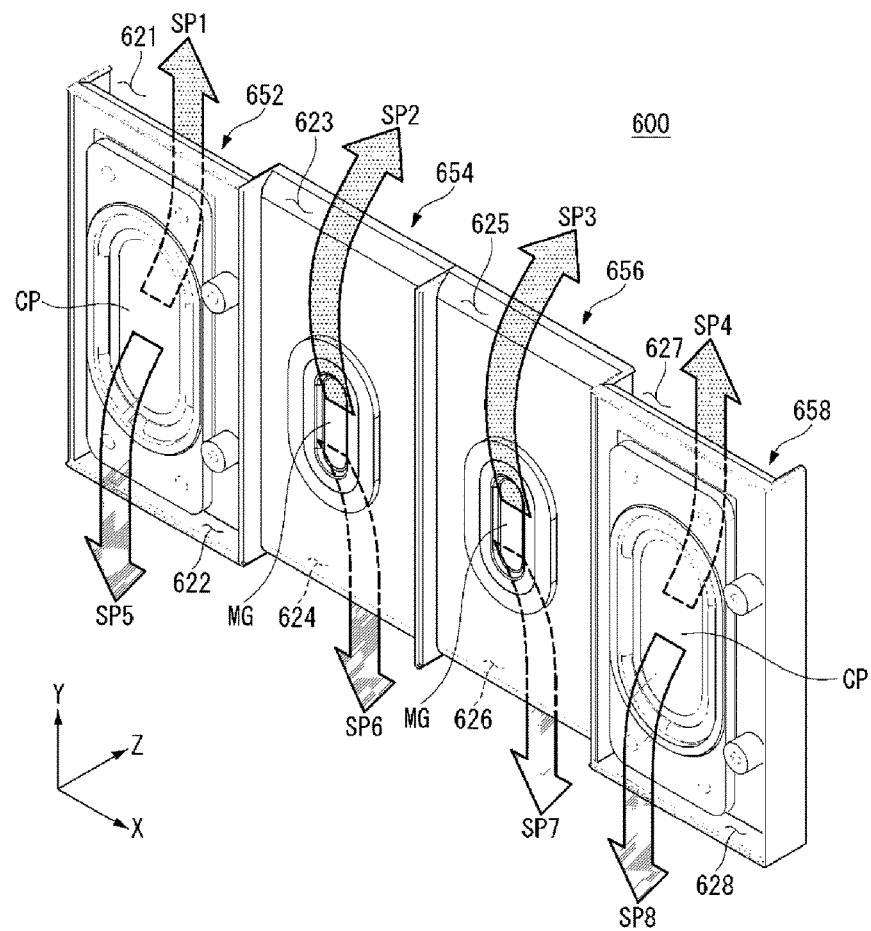
FIGS. 19(a) and 19(b) are diagrams showing a configuration and operation of the speaker module according to another embodiment of the present invention.
Figure 19B:
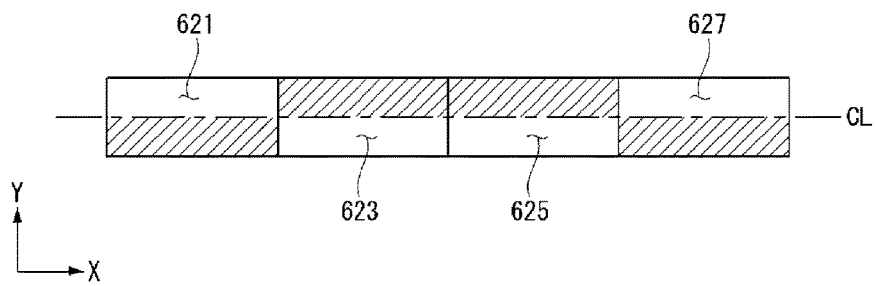

As shown in FIGS. 19(a)-19(b), the speaker module 600 according to another embodiment of the present invention 600 may form sound paths separated in up and down directions.

As shown in FIG. 19(a), the first to fourth speaker units 652, 654, 656, and 658 may be disposed in a horizontal direction. The first and the fourth speaker units 652 and 658 may be disposed in the first direction, and the second and the third speaker units 654 and 656 may be disposed in the second direction. Accordingly, operating vibrations between the first and the second speaker units 652 and 654 and the third and the fourth speaker units 656 and 658 can be offset.

The first to fourth paths SP1 to SP4 may be upwardly formed, and the fifth to eighth paths SP5 to SP8 may be downwardly formed. The first to fourth paths SP1 to SP4 may be paths along which sounds discharged from the front surfaces of the first to fourth speaker units 652, 654, 656, and 658 are outputted. The fifth to eighth paths SP5 to SP8 may be paths along which sounds discharged from the back surfaces of the first to fourth speaker units 652, 654, 656, and 658 are outputted.

As shown in FIG. 19(b), the first to fourth openings 621, 623, 625, and 627 may be seen when viewed from the top of the speaker module 600. The first and the fourth openings 621 and 627 and the second and the third openings 623 and 625 may be disposed to go crisscross. In other words, the first and the fourth openings 621 and 627 may be disposed on one side and the second and the third openings 623 and 625 may be disposed on the other side on the basis of a virtual center line CL.

Figure 20:
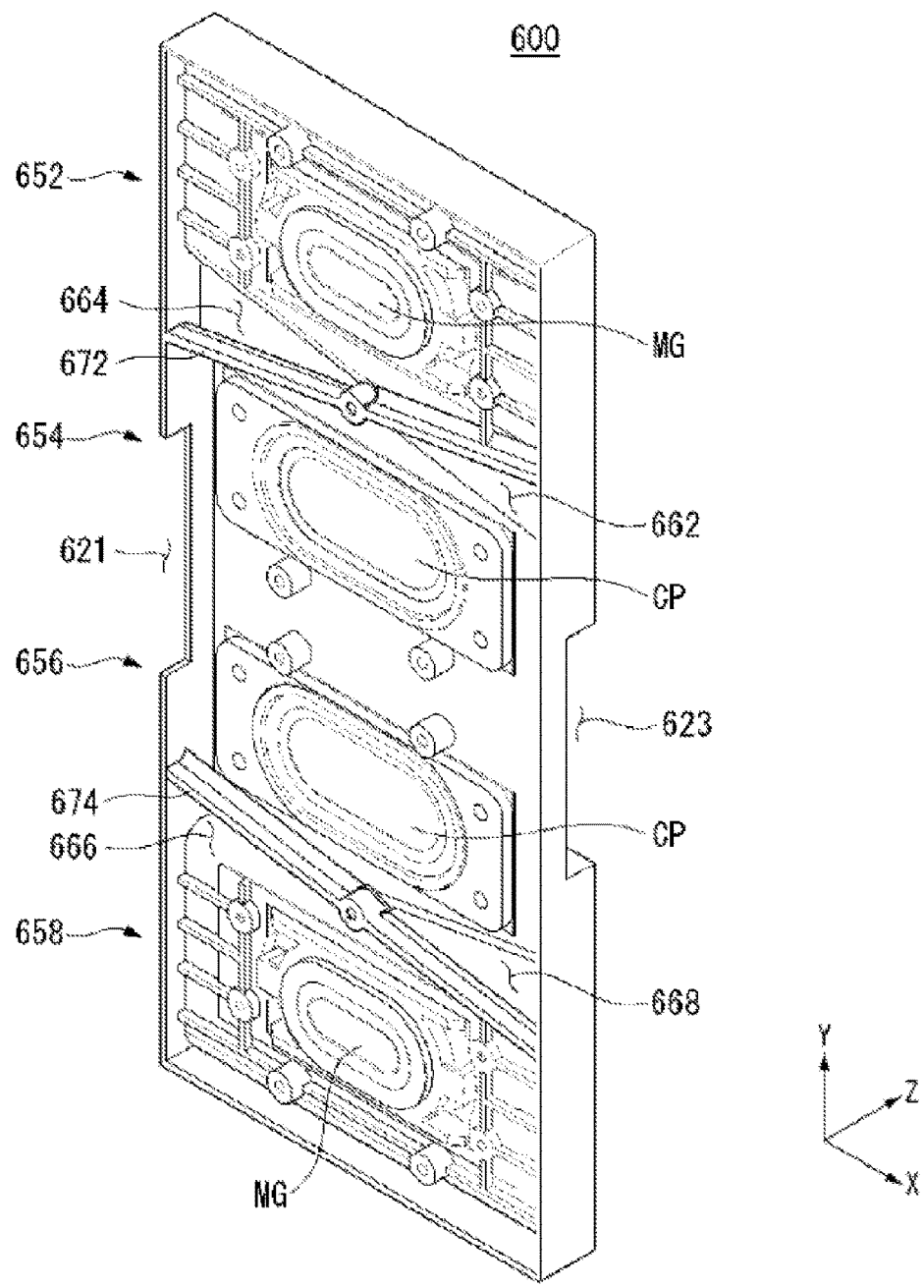
FIGS. 20 and 21 are diagrams showing a configuration and operation of the speaker module according to yet another embodiment of the present invention.
Figure 21:
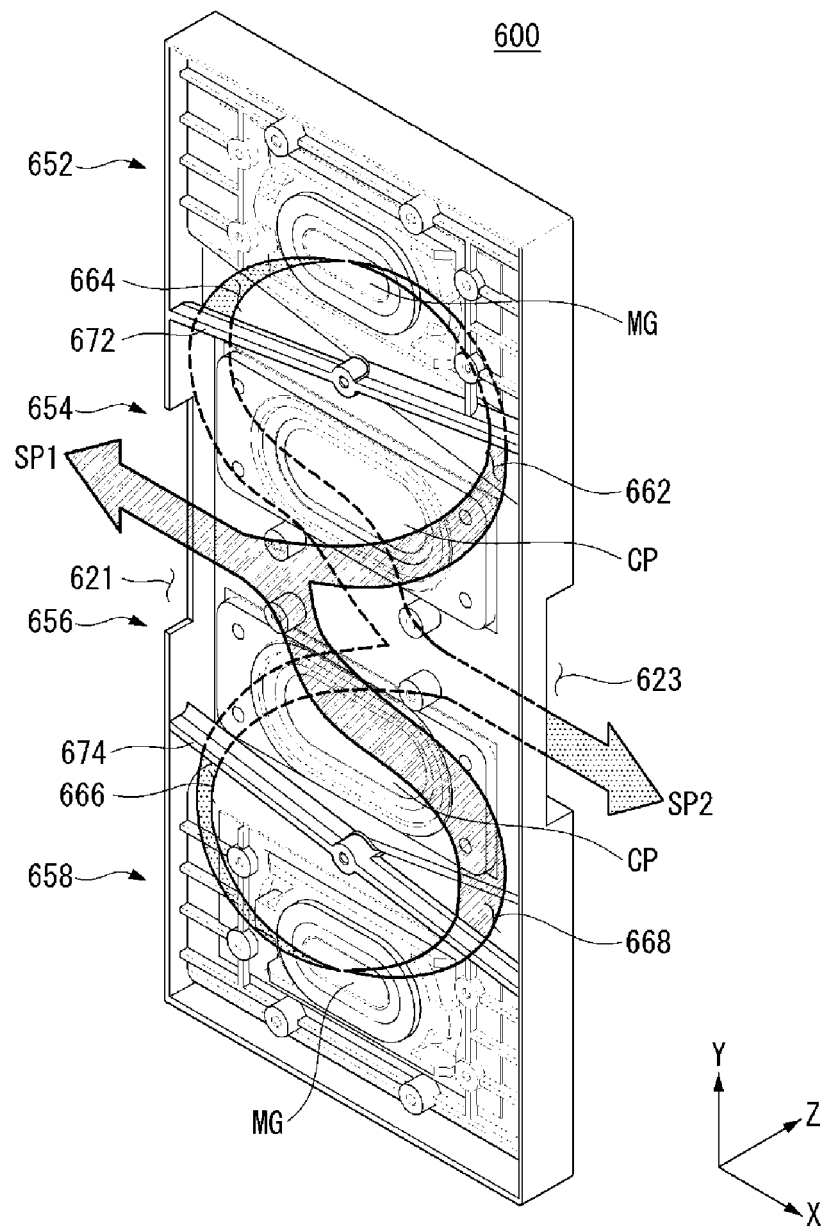

FIGS. 20 and 21 are diagrams showing a configuration and operation of the speaker module according to yet another embodiment of the present invention.

As shown in FIGS. 20 and 21, the speaker module 600 according to yet another embodiment of the present invention may be disposed in a vertical direction.

As shown in FIG. 20, the second and the third speaker units 654 and 656 may be disposed in the first direction, and the first and the fourth speaker units 652 and 658 may be disposed in the second direction.

The first shield rib 672 may be placed between the first and the second speaker units 652 and 654, and the second shield rib 674 may be placed between the third and the fourth speaker units 656 and 658.

The first and the second through holes 662 and 664 may be formed between the first and the second speaker units 652 and 654, and the third and the fourth through holes 666 and 668 may be formed between the third and the fourth speaker units 656 and 658.

As shown in FIG. 21, a sound generated from the front surface of the first speaker unit 652 may be guided into the front surfaces of the second and the third speaker units 654 and 656 through the first through hole 662. A sound generated from the front surface of the fourth speaker unit 658 may be guided into the front surfaces of the second and the third speaker units 654 and 656 through the fourth through hole 668. The sound guided into the front surfaces of the second and the third speaker units 654 and 656 may be outputted to the outside through the first opening 621.

A sound generated from the back surface of the first speaker unit 652 may be guided into the back surfaces of the second and the third speaker units 654 and 656 through the second through hole 664. A sound generated from the back surface of the fourth speaker unit 658 may be guided into the back surfaces of the second and the third speaker units 654 and 656 through the third through hole 666. The sound guided into the back surfaces of the second and the third speaker units 654 and 656 may be outputted to the outside through the second opening 623. The second opening 623 may be placed on the side opposite to the side of the first opening 621.

Figure 22:
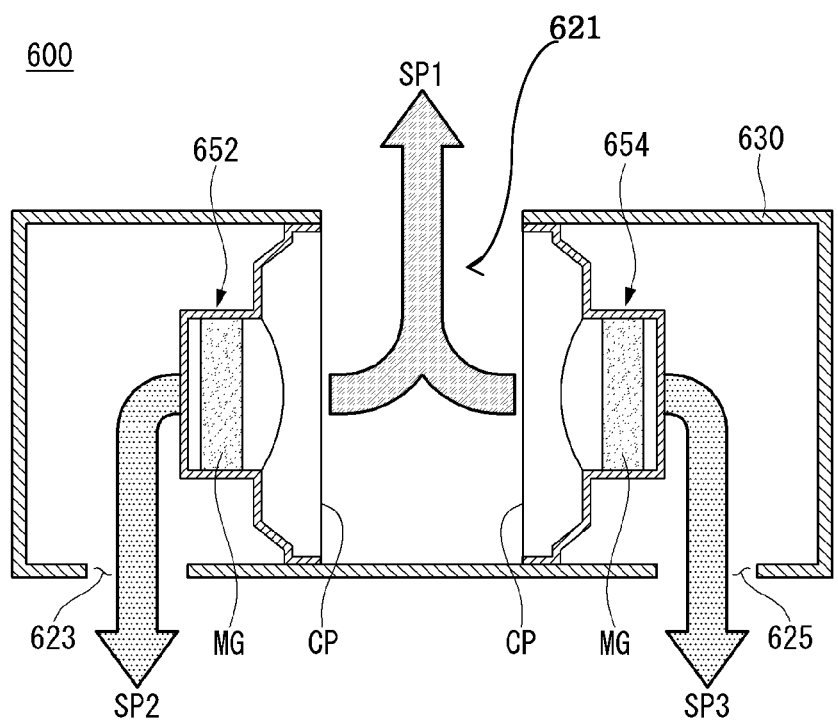
FIG. 22 is a diagram showing a configuration and operation of the speaker module according to yet another embodiment of the present invention.

FIG. 22 is a diagram showing a configuration and operation of the speaker module according to yet another embodiment of the present invention.

As shown in FIG. 22, the plurality of speaker units 652 and 654 of the speaker module 600 according to yet another embodiment of the present invention may be configured to face each other. For example, the pieces of cone paper CP of the first and the second speaker units 652 and 654 may be disposed to face each other.

The first path SP1 may be a path along which sounds generated from the front surfaces of the first and the second speaker units 652 and 654 are merged and outputted to the first opening 621. Accordingly, a total volume of the speaker module 600 can be reduced because sounds generated from the front surfaces of the first and the second speaker units 652 and 654 are merged and outputted to the first path SP1 other than respective paths.

The second and the third paths SP2 and SP3 may be paths along which sounds generated from the back surfaces of the first and the second speaker units 652 and 654 are outputted.

Figure 23:
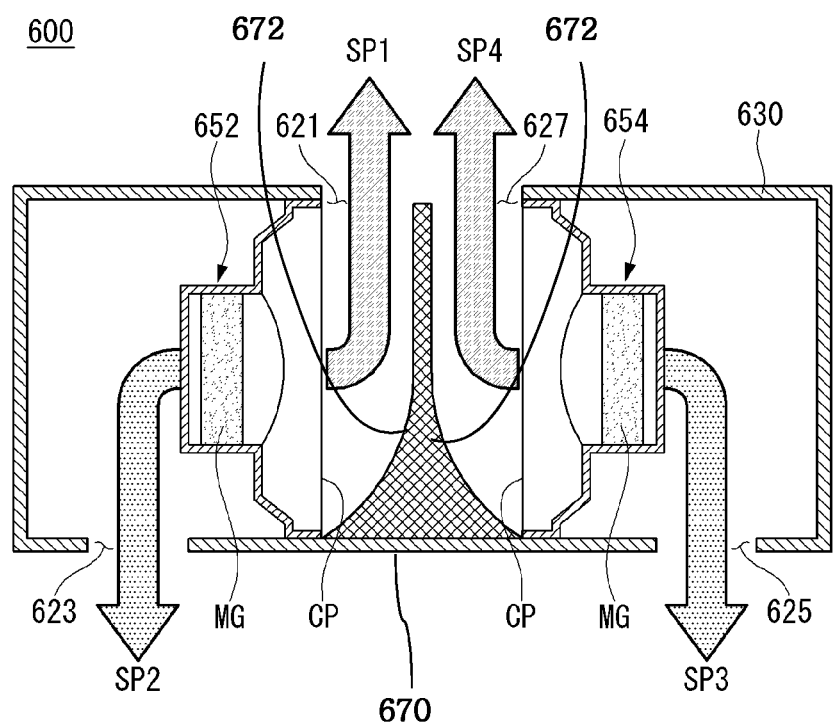
FIG. 23 is a diagram showing a configuration and operation of the speaker module according to yet another embodiment of the present invention.

FIG. 23 is a diagram showing a configuration and operation of the speaker module according to yet another embodiment of the present invention.

As shown in FIG. 23, the speaker module 600 according to yet another embodiment of the present invention may further include a sound guide 670.

The sound guide 670 may have been placed between the first and the second speaker units 652 and 654. The sound guide 670 may allow sounds generated by the first and the second speaker units 652 and 654 to be guided into the first opening 621. Thus sound can be naturally guided into the first opening 621 through the guide surface 672 of a curved type. Accordingly, the first and the fourth paths SP1 and SP4 according to the first and the second speaker units 652 and 654 can be formed more effectively.

As described above, those skilled in the art to which the present invention pertains will understand that the technical configuration of the present invention may be implemented in other detailed forms without changing the technical spirit or essential characteristics of the present invention.

Therefore, it should be understood that the aforementioned embodiments are not limitative, but are illustrative from all aspects. The present invention should be construed as covering all modifications or variations derived from the meanings and scope of the appended claims and equivalents thereof.

What is claimed is:

1. An electronic device, comprising:
   a housing providing an internal space;
   a shield rib installed inside the housing and dividing the internal space into a upper space and a lower space,
   a first speaker unit installed inside the upper space, dividing the upper space into a first front space and a first rear space, and disposed in a first direction; and
   a second speaker unit installed inside the lower space, dividing the lower space into a second front space and a second rear space, and disposed in a second direction,
   wherein the shield rib comprises:
   a first through hole connecting the first front space to the second rear space; and
   a second through hole connecting the first rear space to the second first space,
   wherein the housing comprises:
   a first opening formed on the housing, and connecting the first front space and an outside of the housing; and
   a second opening formed on the housing, and connecting the first rear space and the outside of the housing.

2. The electronic device of claim 1, wherein the first speaker unit comprises a first magnet placed at a back side of the first speaker unit and a first cone paper placed at a front side of the first speaker unit, and the second speaker unit comprises a second magnet placed at a back side of the second speaker unit and a second cone paper placed at a front side of the second speaker unit,
   a back surface of the first cone paper is placed in a front surface of the first magnet, and a back surface of the second cone paper is placed in a front surface of the second magnet
   wherein the first cone paper of the first speaker unit is oriented in the first direction, and the second cone paper of the second speaker unit is oriented in the second direction.

3. The electronic device of claim 1, wherein the first direction and the second direction are parallel to each other and in opposite directions.

4. The electronic device of claim 1, wherein the first speaker unit and the second speaker unit do not overlap with each other in the first and the second directions.

5. The electronic device of claim 4, wherein a front surface of the first cone paper of the first speaker unit and a front surface of the second cone paper of the second speaker unit are placed on a same plane.

6. The electronic device of claim 1, wherein the first opening is disposed on a upper portion of the housing, and the second opening is disposed on a lower portion of the housing.

7. A display device, comprising:
   a display;
   a cable extending from the display; and
   an electronic device separated from the display and exchanges signals with the display through the cable,
   wherein the electronic device comprises:
   a housing providing an internal space;
   a shield rib installed inside the housing and dividing the internal space into a upper space and a lower space; and a speaker module placed in the housing,
wherein the speaker module comprises:
a first speaker unit installed inside the upper space, dividing the upper space into a first front space and a first rear space, and disposed in a first direction; and
a second speaker unit installed inside the lower space, dividing the lower space into a second front space and a second rear space, and disposed in a second direction,
wherein the shield rib comprises:
a first through hole connecting the first front space to the second rear space; and
a second through hole connecting the first rear space to the second first space,
wherein the housing comprises:
a first opening formed on the housing, and connecting the first front space and an outside of the housing; and
a second opening formed on the housing, and connecting the first rear space and the outside of the housing.

8. The display device of claim 7, wherein:
the speaker module is plural, and
the speaker module comprises a first speaker module placed at one end of the housing and a second speaker module placed at another end of the housing.

9. The display device of claim 7, wherein the first speaker unit comprises a first magnet placed at a back side of the first speaker unit and a first cone paper placed at a front side of the first speaker unit, and the second speaker unit comprises a second magnet placed at a back side of the second speaker unit and a second cone paper placed at a front side of the second speaker unit,
a back surface of the first cone paper is placed in a front surface of the first magnet, and a back surface of the second cone paper is placed in a front surface of the second magnet,
wherein the first cone paper of the first speaker unit is oriented in the first direction, and the second cone paper of the second speaker unit is oriented in the second direction.

10. The display device of claim 9, further comprises:
a barrier between the first speaker unit and the second speaker unit;
a first through hole between the first speaker unit and the second speaker unit allowing for a first channel to connect a front side of the first speaker unit with a front side of the second speaker unit; and
a second through hole between the first speaker unit and the second speaker unit allowing for a second channel to connect a back side of the first speaker unit with the back side of the second speaker unit.

11. The display device of claim 7, wherein the first opening is disposed on a upper portion of the housing, and the second opening is disposed on a lower portion of the housing.

* * * * *